United States Patent
de Jesus

(10) Patent No.: US 9,662,589 B2
(45) Date of Patent: May 30, 2017

(54) COMMUNICATING MESSAGES WITHIN NETWORK GAMES

(71) Applicant: Zynga Inc., San Francisco, CA (US)

(72) Inventor: Tiago Amaral Penteado de Jesus, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 15/088,793

(22) Filed: Apr. 1, 2016

(65) Prior Publication Data

US 2016/0214021 A1    Jul. 28, 2016

Related U.S. Application Data

(63) Continuation of application No. 13/828,065, filed on Mar. 14, 2013, now Pat. No. 9,320,971.

(Continued)

(51) Int. Cl.
| | |
|---|---|
| A63F 13/35 | (2014.01) |
| A63F 13/87 | (2014.01) |
| A63F 13/30 | (2014.01) |
| A63F 13/795 | (2014.01) |
| A63F 13/822 | (2014.01) |
| G07F 17/32 | (2006.01) |

(52) U.S. Cl.
CPC .............. *A63F 13/87* (2014.09); *A63F 13/12* (2013.01); *A63F 13/35* (2014.09); *A63F 13/795* (2014.09); *A63F 13/822* (2014.09); *G07F 17/32* (2013.01); *A63F 2300/575* (2013.01)

(58) Field of Classification Search
CPC ........ A63F 13/12; A63F 13/55; A63F 13/822; A63F 2300/575; A63F 2300/807
USPC ....................................... 463/9, 42
See application file for complete search history.

(56) References Cited

U.S. PATENT DOCUMENTS

| | | | |
|---|---|---|---|
| 2011/0212769 A1* | 9/2011 | Carroll ................... | A63F 13/12 463/29 |
| 2012/0259744 A1* | 10/2012 | Ganesh .................. | G06Q 30/00 705/27.2 |

(Continued)

OTHER PUBLICATIONS

"Farmville: plant and grow with friends!", https://www.youtube.com/watch?v=bpPEXNtz_TY&index=3&list=PLF72D85C74D7D9470, published Jul. 9, 2009.*

(Continued)

*Primary Examiner* — Michael Cuff
(74) *Attorney, Agent, or Firm* — Martine Penilla Group, LLP

(57) ABSTRACT

Systems and methods for communicating messages within online games are described. One of the methods includes receiving a message post from a first user. The message post is displayed on an in-game object that is configured for sharing message posts between the first user and other users. The method further includes detecting an interfacing action by a second user with the in-game object. The interfacing action is an input that is responsive to request content that is part of the message post. The method further includes validating the interfacing action to meet a threshold. If the threshold is met, the virtual game object is credited to the game space of the first user. The method includes generating a reward to the second user when the interfacing action is validated. The reward is credited to a game space of the second user.

20 Claims, 17 Drawing Sheets

Related U.S. Application Data

(60) Provisional application No. 61/613,913, filed on Mar. 21, 2012.

(56) References Cited

U.S. PATENT DOCUMENTS

| | | | | |
|---|---|---|---|---|
| 2013/0031009 A1* | 1/2013 | Kapoor | G06Q 30/06 | 705/77 |
| 2013/0031136 A1* | 1/2013 | Shah | G06F 17/30528 | 707/783 |
| 2013/0073474 A1* | 3/2013 | Young | G06Q 10/00 | 705/319 |
| 2013/0097137 A1* | 4/2013 | Kritt | G06F 17/30864 | 707/706 |
| 2013/0110802 A1* | 5/2013 | Shenoy | G06F 17/30876 | 707/706 |
| 2013/0130762 A1* | 5/2013 | John | A63F 13/795 | 463/9 |

OTHER PUBLICATIONS

Farmville: How to Accept Gifts on FarmVille, (https://www.youtube.com/watch?v=s0XWaPosASM), Lila is on Firrre, Jan. 3, 2010.*

* cited by examiner

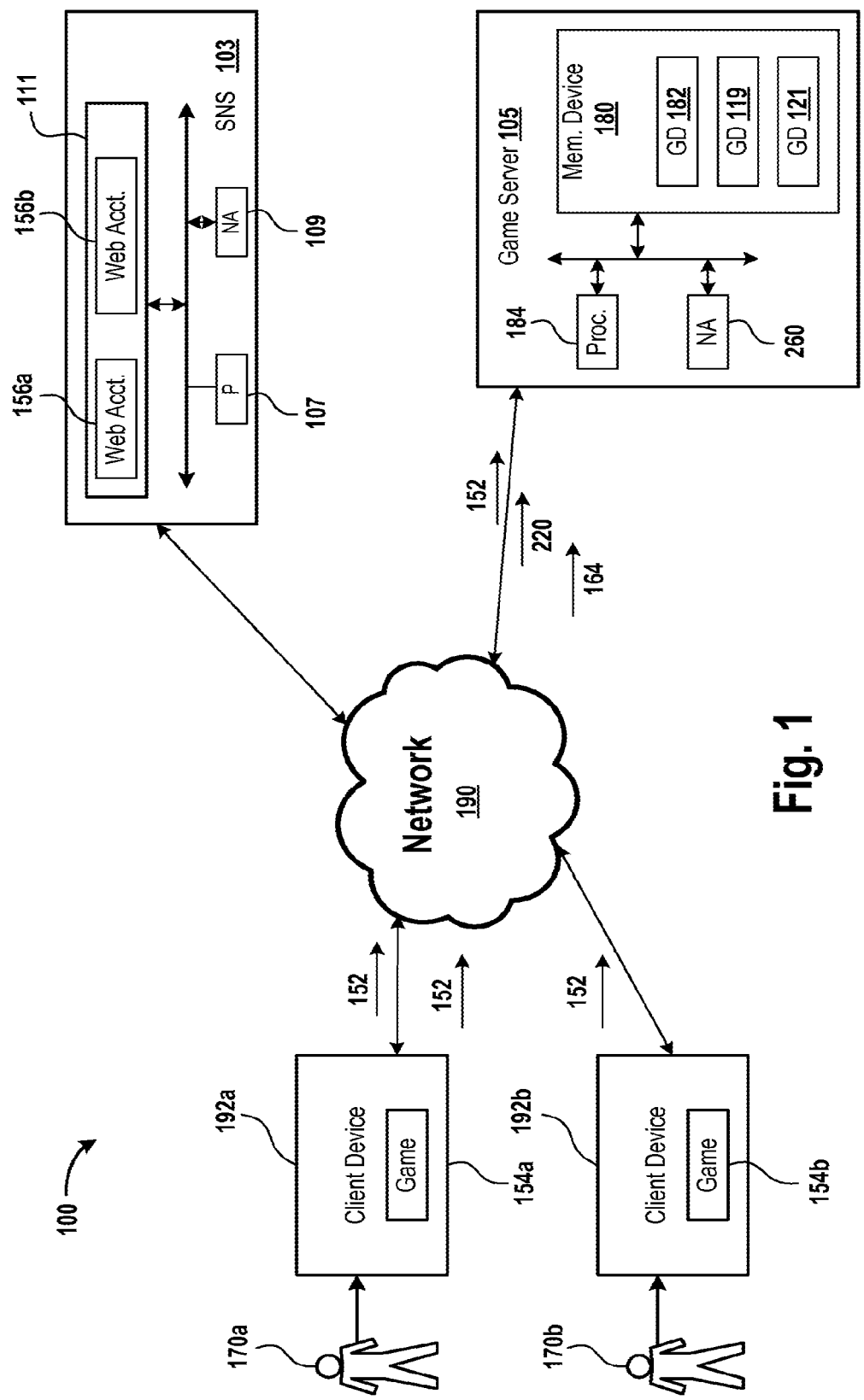

COMMUNICATING MESSAGES WITHIN NETWORK GAMES

CLAIM OF PRIORITY

The present patent application is a continuation of and claims the benefit of and priority, under 35 U.S.C. §120, to U.S. patent application Ser. No. 13/828,065, filed on Mar. 14, 2013, and titled "Communication Messages Within Network Games", which claims the benefit of and priority, under 35 U.S.C. §119(e), to U.S. Provisional Patent Application No. 61/613,913, filed on Mar. 21, 2012, and titled "Communicating Messages Within Network Games", both of which are incorporated by reference herein in their entirety for all purposes.

FIELD

The present disclosure relates to methods and systems for communicating messages within network games.

BACKGROUND

With the advancement of the Internet, a wide variety of games have developed. These games involve various virtual users that perform various actions, such as, shooting and exercising. One person controls one virtual user and another person controls another virtual user. If a person is playing against a computer, the computer controls the other virtual user.

Some games involve in-game communication. For example, a virtual user conveys an in-game message to a person.

It is within this context that embodiments that are described in the present disclosure arise.

SUMMARY

Embodiments of the present invention provide methods and systems for communicating messages within network games.

In some embodiments, a first real user is able to communicate with a second real user within an online game regardless of whether the first real user is logged into a web account to play the online game. The first user is able to communicate a message to a second real user at a time the second real user views the communication even though the first user is logged off from the web account or is disconnected from the web account. The second user views the communication that is within the online game. Such asynchronous communication that occurs when the real users are not logged on simultaneously facilitates convenience in communicating messages within online games between real users.

In another embodiment, a method for communicating messages within online games is described. The method includes receiving a message post from a first user. The message post is being displayed on an in-game object that is configured for sharing message posts between the first user and other users that enter a game space in which the in-game object resides. The method further includes detecting an interfacing action by a second user with the in-game object. The interfacing action is an input that is responsive to request content that is part of the message post. The request content identifies a virtual game object and its value to the first user. The method further includes validating the interfacing action to meet a threshold. If the threshold is met, the virtual game object is credited to the game space of the first user. The method includes generating a reward to the second user when the interfacing action is validated. The reward is credited to a game space of the second user.

In one embodiment, a method for communicating messages within network games is described. The method includes receiving a request to play the game. The method further includes initiating a gaming session upon receiving the request. During the gaming session, environment data of the game is generated in response to receiving the request. The method also includes receiving an interaction with a view item data of the environment data and receiving message data within the view item data upon receiving the interaction. The method includes determining that an end of the gaming session has occurred and receiving an additional request to play an additional game. The additional game is played using an additional web account. The method includes initiating an additional gaming session upon receiving the additional request. During the additional gaming session, the method includes receiving response data in response to the message data.

In another embodiment, a server system for communicating messages within network games is described. The server system includes a communication interface configured to receive a request to play a game. The game is played using a web account. The server system further includes a processor that is configured to initiate a gaming session upon receiving the request. During the gaming session, the processor is configured to generate environment data of the game in response to receiving the request. Also, the environment data includes quest data and view item data. Moreover, during the gaming session, the processor is configured to receive an interaction with the view item data and receive message data within the view item data upon receiving the interaction. The processor is configured to determine that an end of the gaming session has occurred. The communication interface is further configured to receive an additional request to play an additional game. The additional game is played using an additional web account. The processor is configured to initiate an additional gaming session upon receiving the additional request. During the additional gaming session, the processor is configured to receive response data in response to the message data.

Other embodiments of the present invention will become apparent from the following detailed description, taken in conjunction with the accompanying drawings, illustrating by way of example the principles of various embodiments that are described in the present disclosure.

BRIEF DESCRIPTION OF THE DRAWINGS

Various embodiments of the present invention may best be understood by reference to the following description taken in conjunction with the accompanying drawings in which:

FIG. 1 is a block diagram of an architecture for communicating requests for gaming sessions, in accordance with one embodiment of the present invention.

DETAILED DESCRIPTION

Figure 2A:
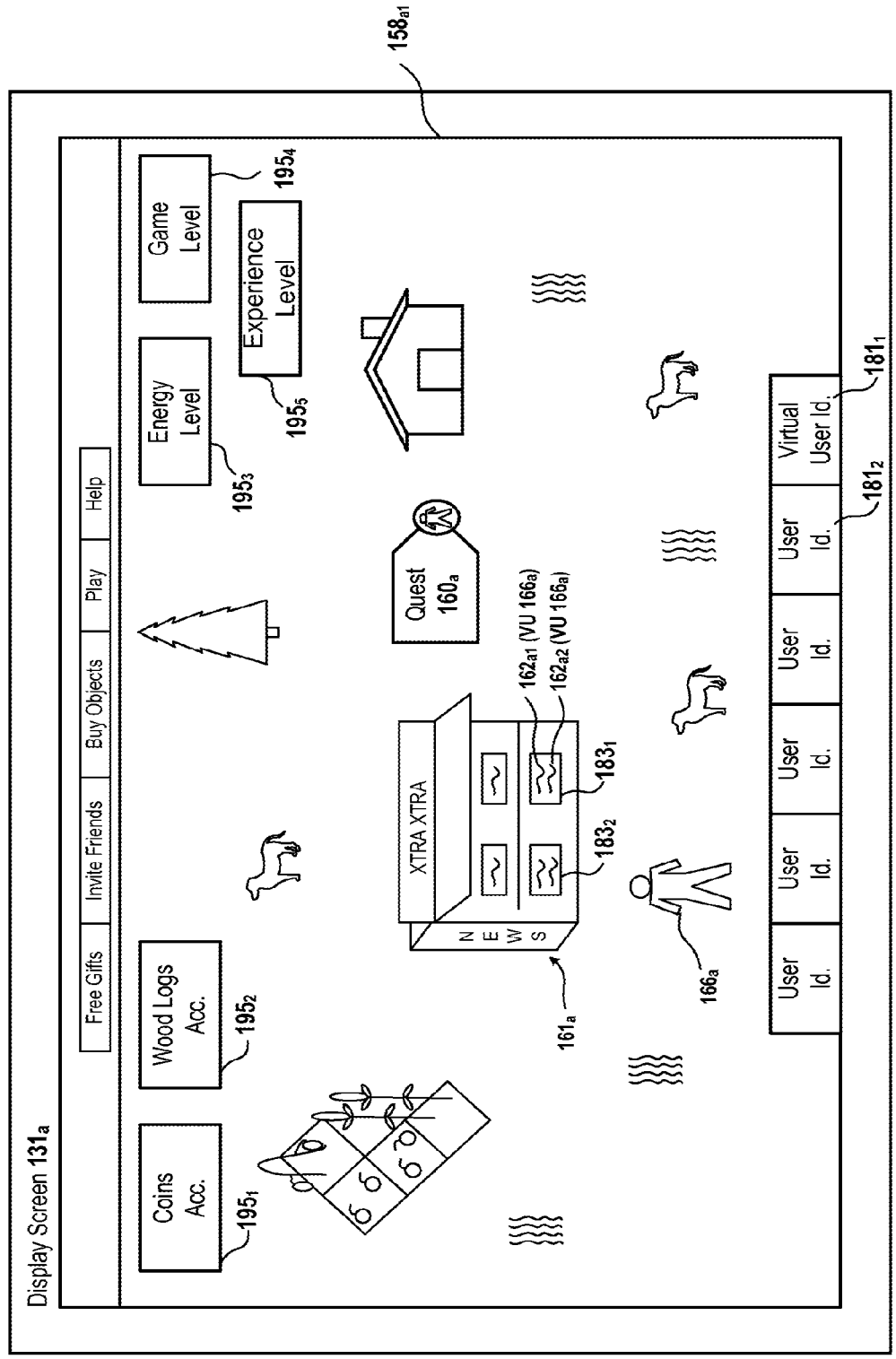
FIG. 2A is a diagram of a display screen that shows a virtual user within a gaming environment, in accordance with another embodiment of the present invention.

It should be noted that various embodiments of the present invention may be practiced without some or all of these specific details. In other instances, well known process operations have not been described in detail in order not to unnecessarily obscure various embodiments of the present invention.

FIG. 1 is a block diagram of an embodiment of an architecture 100 for communicating requests for gaming sessions. A real user $170_a$ logs into a web account $156_a$ that is maintained in a memory device 111 of a social network server (SNS) 103 by providing login information to a client device $192_a$. For example, the real user $170_a$ provides, via an input device of the client device, identifying information, such as a username and a password, that identifies the real user $170_a$ to the SNS 103. In some embodiments, a web browser is accessed via an input device of a client device to provide login information of a real user to the SNS 103.

Examples of a memory device include a read-only memory (ROM), a random access memory (RAM), a flash memory, a nonvolatile memory, a magnetic memory, and a volatile memory. Examples of a client device include a computer, a desktop computer, a laptop computer, a tablet, and a cell phone. Examples of an input device include a keyboard, a mouse, a touch screen, and a stylus. A server, as used herein, includes a physical machine or a virtual machine.

The SNS 103 includes a processor 107 and a communication interface 109. As used herein, a processor includes a central processing unit (CPU), an application specific integrated circuit (ASIC), a field programmable gate array (FPGA), or a microprocessor. Examples of a communication interface include a network interface controller, a network adapter, and a modem. A network adapter includes a processor and a memory device, which may include a data buffer.

When the login information of the real user $170_a$ is authenticated by the SNS 103, the real user $170_a$ is provided access to the web account $156_a$. Otherwise, when the SNS 103 determines that the login information is unauthentic, the real user $170_a$ is prevented from accessing the web account $156_a$. The web account $156_a$ is assigned by the social network server 103 to the real user $170_a$ and the web account $156_b$ is assigned by the social network server 103 to the real user $170_b$.

In various embodiments, the SNS 103 provides a social network service to allow real users 170 to communicate with each other via respective web accounts 156 that are maintained in the memory device 111. For example, the real user $170_a$ posts a message in his/her web account $156_a$ and addresses the message to the web account $156_b$ of the real user $170_b$. When the real user $170_b$ gains access to his/her web account $156_b$, the real user $170_b$ can see the message. In some embodiments, the SNS 103 also provides other services, such as facilitating chatting with other uses and facilitating posting multimedia, such as text, images, video, audio, or a combination thereof, by real users. The multimedia is posted to the SNS 103 by a real user via a client device and a web account, and is accessible by other real users who are allowed access by the real user.

Upon gaining access to the web account $156_a$, the real user $170_a$ selects a button on the input device of the client device $192_a$ to play a game $154_a$ and when the button is selected, the client device $192_a$ sends a request 152 via a network 190 to a game server 105 to access the game $154_a$ on a display device of the client device $192_a$. Examples of a display device include a light emitting diode (LED) display device, a liquid crystal display (LCD) device, a cathode ray tube (CRT) display device, and a plasma display device. Examples of the network 190 include a wired network, a combination of a wired network and a wireless network, a local area network (LAN), a wide area network (WAN), a combination of a local area network and a wide area network, the Internet, an Intranet, and a combination of the Internet and an Intranet. The game server 105 includes a processor 184, a communication interface 260, and a memory device 180.

When the request 152 is received by the communication interface 260 of the game server 105, the communication interface 260 sends game data 182 to the client device $192_a$ via a network 190. It should be noted that game data is generated by a processor 184 of the game server 105. The game data 182 is rendered by a graphical processing unit (GPU) of the client device $192_a$ to display the game $154_a$. When the game $154_a$ is accessed via the request 152, the real user 170a plays the game $154_a$ during a gaming session.

A gaming session that is generated based on a request starts when game data that is rendered to generate a game on a display screen of a client device is sent by the game server 105 to the client device. For example, the gaming session that is generated based on the request 152 starts when the game data 182 is sent by the game server 105 via the network 190 to the client device $192_a$ to generate the game $154_a$.

Similarly, the real user $170_b$ provides his/her login information via a client device 192b to log into the web account $156_b$ and when authenticated by the SNS 103, is provided access to the web account $156_b$. When access to the web account $156_b$ is provided, the real user $170_b$ selects a button on an input device of the client device $192_b$ to play the game $154_b$ and when the button is selected, the client device $192_b$ sends a request 164 via the network 190 to the communication interface 260 of the game server 105 to play a game $154_b$. Upon receiving the request 164, the game server 105 provides access to game data 119 to allow the real user $170_b$ to play the game $154_b$ on a display device of the client device $192_b$. When the game $154_b$ is accessed via the request 164, the real user $170_b$ plays the game $154_b$ during a gaming session.

In one embodiment, games $154_a$ and $154_b$ are the same. For example, both games $154_a$ and $154_b$ are a Pioneer Trail™ game available from Zynga™ Corporation of San Francisco, Calif. As another example, both games $154_a$ and $154_b$ are a FarmVille™ game available from Zynga Corporation.

In other embodiments, game $154_a$ is different than the game $154_b$. For example, game $154_a$ is the Pioneer Trail™ game and game $154_b$ is the FarmVille™ game. As another example, game $154_a$ is a CastleVille™ game available from Zynga™ Corporation and game $154_b$ is the FarmVille™ game.

At some time after the gaming session is accessed via the request 152, the SNS 103 determines that the gaming session has ended. For example, a gaming session ends when the real user $170_a$ selects a button on the input device of the client device $192_a$ to log out of the web account $156_a$. In this example, when an indication of the log out is received, the client device $192_a$ sends a request to end the gaming session via the network 190 to the SNS 103. As another example, a gaming session ends when a connection between the client device $192_a$ and the SNS 103 or the game server 105 is lost. A connection between a server and a client device is lost due to a variety of factors, such as, a malfunction in network 190, a malfunction in the client device, a loss of power to the network 190, a loss of power to the server, a loss of power to the client device, or a combination thereof. As yet another example, a gaming session ends when latest game data that is stored on the game server 105 is not received by a client device. In this example, a parameter of the game $154_a$ is changed on the game server 105 and has not changed on the display device of the client device $192_a$. Moreover, in this example, the real user $170_a$ has not logged out of the web account 156a after accessing the gaming session with the request 152. Also, in this example, connections between the client device 192a and the servers 103 and 105 exist. Examples of a game parameter of a game include an amount within a virtual score-keeping game object, which is described below and a position of a virtual animation object, which is also described below.

After the termination of the gaming session that is accessed with the request 152, the real user $170_a$ sends another request 220 via the client device $170_a$ and network 190 to play the game $154_a$. In some embodiments, if the real user $170_a$ logged out of the web account $156_a$ to log out of the gaming session that is accessed using the request 152, the real user $170_a$ logs back into the web account 156 to access the game $154_a$ again before playing the game $154_a$. For example, after a log out from the web account $156_a$, the real user $170_a$ provides his/her login information to the SNS 103 that determines whether the log in information is authentic. Upon determining that the login information is authentic, the real user $170_a$ is provided access to the web account $156_a$. Upon receiving access, the real user $170_a$ again selects a button on the input device of the client device $192_a$ to play the game $154_a$. When an indication of the selection is received by the client device $192_a$, the client device $192_a$ sends the request 220 via the network 190 to the communication interface 260 of game server 105.

In other embodiments, if a connection between the client device $192_a$ and the server 103 or 105 is lost and the connection is re-established, the real user $170_a$ logs back into his/her web account $156_a$ to play the game $154_a$. Moreover, in various embodiments in which there is a connection between the client devices $192_a$ and the servers 103 and 105, and the real user $170_a$ is not logged out of the web account $156_a$ after accessing the gaming session with the request 152, the real user $170_a$ selects a refresh button on the input device of the client device $192_a$ to continue playing the game $154_a$. When the refresh button is selected, the client device $192_a$ generates the request 220 and sends the request 220 via the network 190 to the game server 105.

When the request 220 is received, the game server 105 sends game data 121 via the network 190 to the client device $192_a$. Upon receiving the game data 121, the GPU of the client device $192_a$ renders the game data 121 to display the game $154_a$. When the game $154_a$ is accessed via the request 220, the real user $170_a$ plays the game $154_a$ during a gaming session that is different than the gaming session that is generated with the request 152.

In other embodiments, the web accounts 156 are maintained in the game server 105 instead of in the SNS 103. For example, the web accounts 156 are not provided by a social network service but by a gaming service. The gaming service allows the real users 170 to play games online via the World Wide Web with the user of web accounts 156 that are independent of a social gaming service.

It should further be noted that in one embodiment, a server includes any number of components. For example, the game server 105 includes more than one processor and/or more than one memory devices. In some embodiments, any functions described as being performed by a server are performed by one or more processors of the server. For example, functions that are described as being performed by the SNS 103 are performed by one or more processors, such as processor 107, of server SNS 103. As another example, functions that are described as being performed by game server 105 are performed by one or more processors, such as processor 184, of game server 105.

Moreover, in other embodiments, any functions described as being performed by a server are performed by one or more processors of one or more servers. In various embodiments, any authentication that is described herein as being performed by the SNS 103 is performed by an authentication server (not shown).

It is noted that indication of any interaction, such as a selection, hovering, browsing, etc., by a real user via an input device of a client device with a gaming environment, which is described below, is received by the game server 105 via the network 190. Moreover, any information, such as data within messages, that is entered by a real user within a game is also received by the game server 105 via the network 190.

FIG. 2A is a diagram of an embodiment of a display screen 131$_a$ of the client device 192$_a$ (FIG. 1). The display screen 131$_a$ displays an environment 158$_{a1}$ of the game 154$_a$. Examples of an environment include a virtual farm, a virtual town, a virtual café, a virtual castle, a virtual casino, and a virtual city. The environment 158$_{a1}$ is displayed when the request 152 (FIG. 1) is communicated to generate a gaming session. The environment 158$_{a1}$ is displayed when the GPU of the client device 192$_a$ renders the game data 182 (FIG. 1).

An environment includes virtual game objects, which include virtual score-keeping game objects and virtual animation objects. Examples of virtual animation objects include virtual farms, virtual flora, virtual structures, virtual vehicles, virtual animals, virtual harvestable patches of land, virtual view items, and virtual users. Examples of virtual view items include a virtual publication item and a virtual message item. A virtual view item is sometimes referred to herein as an in-game object. It should be noted that in some embodiments, a virtual structure includes a virtual view item. Examples of a virtual view item include a virtual newsstand, which has virtual information items, such as virtual newspapers, virtual magazines, virtual food, virtual drinks, and virtual message posts. It should be noted that in some embodiments, the terms "message post" and "message" are used interchangeably. Examples of a virtual structure include a virtual house, a virtual building, a virtual skyscraper, a virtual shack, a virtual barrack, a virtual barricade, a virtual road divider, and a virtual roadblock.

A virtual score-keeping object includes an amount, such as a value or a number, of a virtual animation object, such as a virtual service or a virtual product, that is accumulated during a play of a game by a virtual user. Examples of an amount of a virtual product include a number of virtual structures built during play of a game, a number of virtual animals fed during play of a game, a number of virtual coins accumulated by a virtual user during play of a game, a number of virtual daubers accumulated by a virtual user during play of the game, a number of virtual wood logs accumulated during play of the game, an amount of virtual grass accumulated during play of the game, an amount of virtual food accumulated during play of the game, an amount of virtual rent collected for using a virtual structure during play of the game, and an amount of virtual gold stars earned during play of the game, a game level assigned to a virtual user during play of the game, an experience level assigned to a virtual user during play of the game, and an energy level of a virtual user during play of the game. An environment is sometimes referred to herein as a game space.

Examples of an amount of a virtual service includes a number of times a virtual bridge is crossed during play of a game, a number of times help is provided by a virtual user to another virtual user during play of a game, a number of times a virtual structure is used during play of the game, a number of times virtual crops are harvested during play of the game, a number of times a virtual vehicle is driven during play of the game, a number of times a virtual animal is used during play of the game, and a number of times a virtual animal is fed during play of the game.

The environment 158$_{a1}$ includes a number of virtual score-keeping objects 195 that includes various amounts of virtual animation objects that are accumulated by the virtual user 166$_a$. For example, the environment 158$_{a1}$ includes a score-keeping object 195$_1$ that includes a number of coins that is accumulated by the virtual user 166$_a$ within the game 154$_a$, a score-keeping object 195$_2$ that includes a number of wood logs accumulated by the virtual user 166$_a$ within the game 154$_a$, a score-keeping object 195$_3$ that includes an energy level of the virtual user 166$_a$ within the game 154$_a$, a score-keeping object 195$_4$ that includes a game level of the game 154$_a$, and a score-keeping object 195$_5$ that includes an experience level of the virtual user 166$_a$ within the game 154$_a$.

The display screen 131$_a$ includes multiple buttons, which allow a real user to provide selection to access various aspects of a game. For example, when a real user selects an "Invite Friends" button on the display screen 131$_a$, the game server 105 communicates with the SNS 103 to allow the real user 170$_a$ to invite his/her social network friends to play a game or some part of the game that is displayed on the display screen. As another example, when a real user selects a "Buy Objects" button that is displayed on a display screen during a play of a game, the game server 105 allows the real user to buy virtual products and/or virtual services of the game. As yet another example, when a real user selects a "Free Gifts" button that is displayed on a display screen of a client device during a play of a game, the game server 105 provides gift data to the client device that renders the gift data to display gifts that are free on the display screen. In some embodiments, a gift is free when the gift is provided to a virtual user without a monetary loss to a real user, a virtual product loss to the virtual user, and a virtual service loss to the virtual user. As yet another example, when a real user selects a "Play" button on the display screen 131$_a$, the real user plays or continues playing a game that is displayed on the display screen 131$_a$.

At the bottom of the environment 158$_{a1}$, there are user identifications (IDs) buttons, such as virtual user ID button 181$_1$ and a real user ID button 181$_2$. A virtual user ID is an identification, such as an image or a username, of a virtual user and a real user ID is an identification, such as an image or a username, of a real user. When a real user selects a user ID button via an input device of a client device, the game server 105 sends option data to the client device. The option data is rendered by the GPU of the client device to display options, such as, an option to visit an environment that is associated with the user ID of the user ID button that is selected, hiring a virtual user that is associated with the user ID, inviting a real user having the user ID to play a game, and inviting a virtual user having the user ID to play a game.

In some embodiments, when the option regarding visiting an environment is selected by a real user via an input device of a client device, the game server 105 sends environment data to the client device and the environment data is rendered by the GPU of the client device to display an environment that is associated with the user ID that is used to visit the environment. For example, when the real user 170$_a$ selects the virtual user ID button 181$_1$, the game server 105 sends environment data to the client device 192$_a$ and the GPU of the client device 192$_a$ renders the environment data to display an environment that includes the virtual user.

The environment $158_{a1}$ includes a quest $160_a$ that can be achieved by a virtual user $166_a$ of the environment $158_{a1}$. Examples of a quest include a goal within a game, such as a goal of achieving an amount within a virtual score-keeping object, a goal of accumulating a number of virtual products, and a goal of providing a number of virtual services. In some embodiments, a quest when achieved leads to another quest, which is displayed when the game server 105 sends quest data that is rendered to display the other quest. In some embodiments, the quest $160_a$ is offered by the virtual user having the virtual user ID $181_1$. In other embodiments, the quest $160_a$ is offered by a real user, such as the real user $170_b$ having the real user ID $181_2$.

The environment $158_{a1}$ includes a virtual user $166_a$ that is assigned, by the game server 105, to the real user $170_a$. The virtual user $166_a$ is controlled by the real user $170_a$ within the game $154_a$ via the input device of the client device $192_a$.

The environment $158_{a1}$ also includes a virtual publication item 161a, such as a virtual structure, which is owned or leased by the virtual user $166_a$. For example, the publication item $161_a$ is a virtual newsstand. When the virtual user $166_a$ is on the quest $160_a$, the environment $158_{a1}$ lacks an amount of virtual animation objects that is helpful to the virtual user $166_a$ to achieve the quest $160_a$. For example, the environment $158_{a1}$ lacks a number of virtual trees that is helpful to the virtual user $166_a$ to achieve a quest of accumulating a hundred wood logs. As another example, the environment $158_{a1}$ lacks a number of harvestable patches of land that is helpful to the virtual user $166_a$ to achieve a quest of accumulating two-hundred virtual tomatoes. As yet another example, the environment $158_{a1}$ lacks virtual manpower to achieve a quest.

The lack of the amount of virtual animation objects is sent as lack data by the game server 105 to the client device $192_a$ and is rendered by the GPU of the client device $192_a$ to display the lack. When the real user $170_a$ views the lack of the number of virtual products, the real user $170_a$ selects via the input device of the client device $192_a$ the publication item 161a. When the publication item $161_a$ is selected, the game server 105 allows the real user 170a to enter a wish list of one or more messages, such as messages $162_{a1}$ and $162_{a2}$, within the publication item $161_a$ via the input device of the client device $192_a$. The messages $162_{a1}$ and/or $162_{a1}$ indicate to a real user that the virtual user $166_a$ lacks one or more virtual animation objects. For example, the message $162_{a1}$ includes "I wish to have wood" and the message $162_{a2}$ includes "I need fire". As another example, the message $162_{a1}$ includes "I need help to cross a bridge".

Any messages received from the real user $170_a$, from real users who are social network friends of the real user $170_a$, and from virtual users whose IDs are displayed in the environment $158_{a1}$ are received within a portion $183_1$ of a view item. In other embodiments, the portion $183_1$ is prevented by the game server 105 from receiving messages from real users other than the real user $170_a$ and from receiving messages from virtual users other than the virtual user $166_a$. In these embodiments, another portion $183_2$ of the view item is designated by the game server 105 for receiving messages from a virtual user other than the virtual user $166_a$ and/or a real user other than the real user $170_a$.

In some embodiments, the game server 105 avoids publishing any messages posted within the publication item $161_a$ to web accounts of real users, such as real user $170_b$, that are social network friends of the real user $170_a$. For example, when the message $226_{a1}$ is posted within the publication item $161_a$, the message $226_{a1}$ is not published by the game server 105 to a publication item $161_b$, which is described below in FIG. 2B.

Figure 2B:
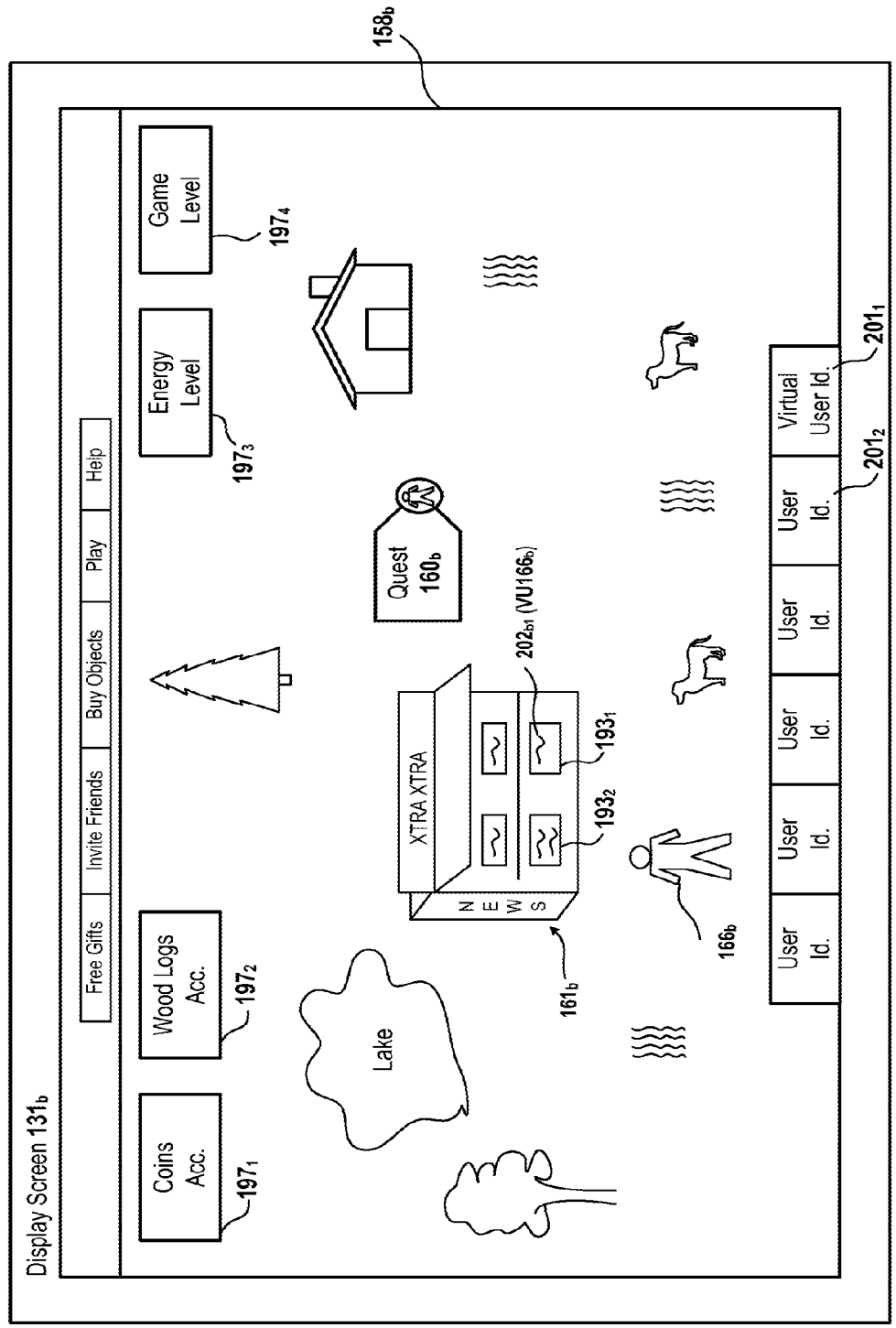
FIG. 2B is a diagram of a display screen that shows another virtual user within another gaming environment, in accordance with one embodiment of the present invention.

FIG. 2B is a diagram of an embodiment of a display screen $131_b$ of the client device $170_b$ (FIG. 1). The display screen $131_b$ displays an environment $158_b$ of the game $154_b$ (FIG. 1). The environment $158_{b1}$ is displayed during a gaming session of the game $154_b$ and the gaming session is generated when the request 164 (FIG. 1) is communicated to generate a gaming session. The environment $158_{b1}$ is displayed when the GPU of the client device $192_b$ renders the game data 119 (FIG. 1). The environment $158_b$ includes a virtual user $166_b$. The virtual user $166_b$ is assigned, by the game server 105, to the real user $170_b$. The virtual user $166_b$ is controlled by the real user $170_b$ within the game $154_b$ via the input device of the client device $192_b$. The environment $158_b$ also includes the publication item $161_b$ that is selected by the user $170_b$ via the input device of the client device $192_b$ to enter one or more messages, such as a message $202_{b1}$, within a portion $193_1$. The publication item $161_b$ is owned or leased by the virtual user $166_b$.

Any messages received from the real user $170_b$, from real users who are social network friends of the real user $170_b$, and from virtual users whose IDs are displayed in the environment $158_b$ are received within a portion $193_1$ of a view item. In other embodiments, the portion $193_1$ is prevented by the game server 105 from receiving messages from real users other than the real user $170_b$ and from receiving messages from virtual users other than the virtual user $166_b$. In these embodiments, another portion $193_2$ of the view item is designated by the game server 105 for receiving messages from a virtual user other than the virtual user $166_b$ and/or a real user other than the real user $170_b$. In one embodiment, the environment $158_b$ excludes the publication item $161_b$.

The environment $158_b$ includes a number of virtual score-keeping objects 197 that includes an amount of virtual animation objects that are accumulated by the virtual user $166_b$. For example, the environment $158_b$ includes a score-keeping object $197_1$ that includes a number of points that is accumulated by the virtual user $166_b$, a score-keeping object $197_2$ that includes a number of wood logs accumulated by the virtual user $166_b$, a score-keeping object $197_3$ that includes an energy level of the virtual user $166_b$, and a score-keeping object $197_4$ that includes a game level of the game $154_b$.

The environment $158_b$ includes a quest $160_b$ that can be achieved by the virtual user $166_b$. In some embodiments, the quest $160_b$ is offered by a virtual user having a virtual user ID $201_1$. In other embodiments, the quest $160_b$ is offered by a real user, such as the real user $170_a$ having a real user ID $201_2$.

The real user $170_b$ selects via the input device of the client device $192_a$ the real user ID $201_2$. When selected, the game server 105 provides option data to the client device $154_b$ and the GPU of the client device $154_b$ renders the option data to display options on the display screen $131_b$. One of the options that are displayed on the display screen $131_b$ include an option to visit the environment $158_{a1}$ (FIG. 2A). When the real user $170_b$ selects via the input device of the client device $192_a$ the option to visit the environment $158_{a1}$ in which the virtual user $166_a$ is playing the game $154_a$, the virtual user $166_b$ visits the environment $158_{a1}$.

Figure 2C:
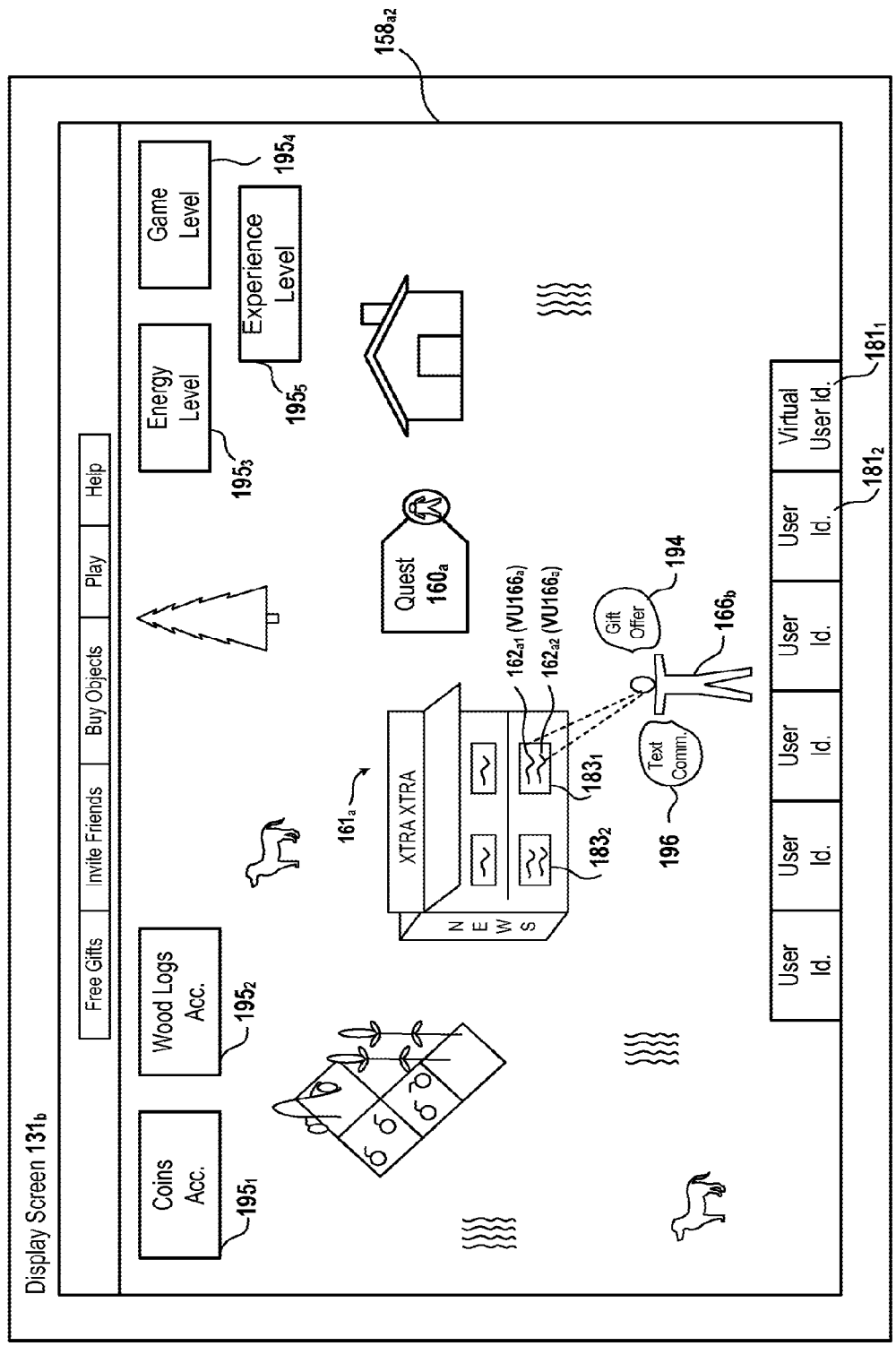
FIG. 2C is a diagram of a display screen that shows the virtual user of FIG. 2B visiting the gaming environment of FIG. 2A, in accordance with one embodiment of the present invention.

FIG. 2C is a diagram of an embodiment of the display screen $131_b$. The display screen $131_b$ displays an environment $158_{a2}$ of the game $154_a$ and the environment $158_{a2}$ is displayed when the virtual user $166_b$ visits the environment $158_{a1}$ (FIG. 2A). For example, when the real user $170_b$ selects the visit option of the environment $158_b$ (FIG. 2B), the game server 105 sends game data to the client device $192_b$ and the GPU of the client device $192_b$ renders the game data to generate the environment $158_{a2}$. The virtual user $166_b$ visits the environment $158_{a1}$ during the same gaming session as that in which the environment $158_b$ is generated.

The real user $170_b$ is logged on to the web account $156_b$ to access the gaming session that is generated with the request 164 (FIG. 1). Moreover, after playing the game $154_a$ during the gaming session that is generated with the request 152 (FIG. 1), the gaming session ends. As an example, after playing the game $154_a$ during the gaming session that is generated with the request 152, the real user $170_a$ logs off the web account $156_a$ (FIG. 1). When the gaming session that is generated with the request 152 ends, the environment $158_{a2}$ excludes the virtual user $166_a$.

When the real user $170_b$ selects the publication item $161_a$ on the display screen $131_b$, the virtual user $166_b$ approaches the publication item $161_a$ and views the messages $162_{a1}$ and $162_{a2}$. For example, when the real user $170_b$ selects the publication item $161_a$, the virtual user $166b$ walks to the publication item $161_a$ and the publication item $161a$ is within a line of sight of the virtual user $166_b$ to allow the virtual user $166_b$ to view the messages $162_{a1}$ and $162_{a2}$. The game server 105 determines that the virtual user $166_b$ can fulfill the wish in the message $162_{a1}$ of the virtual user $166_a$. Upon determining so, the game server 105 sends data to the client device $192_b$ and the data is rendered by the GPU of the client device $192_b$ to display an offer 194 and to display a text communication 196 that responds to the message $162_{a1}$. Each of the offer 194 and the text communication 196 is displayed in a balloon. In other embodiments, the offer 194 and text communication 196 are displayed within another form, such as a square form, a polygonal form, a rectangular form, etc. The offer 194 includes a description of a gift in the form of multimedia. An example of the gift offered in the offer 194 includes a virtual animation object. Another example of the gift offered in the offer 194 includes a virtual animation object that is wished for in the wish list within the publication item $161_a$. Yet another example of the gift offered in the offer 194 includes a virtual animation object other than one wished for in the wish list of the publication item $161_a$. Examples of the text communication 196 include "Your wish regarding wood logs is fulfilled" and "here are some wood logs".

In other embodiments, the real user $170_a$ is logged on to play the game $154_a$ when the virtual user $166_b$ visits the environment $158_{a1}$ to generate the environment $158_{a2}$. As an example, when the virtual user $166_b$ visits the environment $158_{a1}$ to generate the environment $158_{a2}$, the real user $170_a$ is logged on to the gaming session that is generated with the request 152. In these embodiments, the environment $158_{a2}$ includes the virtual user $166_a$.

In yet other embodiments, regardless of whether the real user $170_a$ is logged on to play the game 154 when the virtual user $166_b$ visits the environment $158_{a1}$ to generate the environment $158_{a2}$, the environment $158_{a2}$ includes the virtual user $166_a$. In some embodiments, the environment $158_{a2}$ excludes the offer 194 or the text communication 196.

Figure 2D:
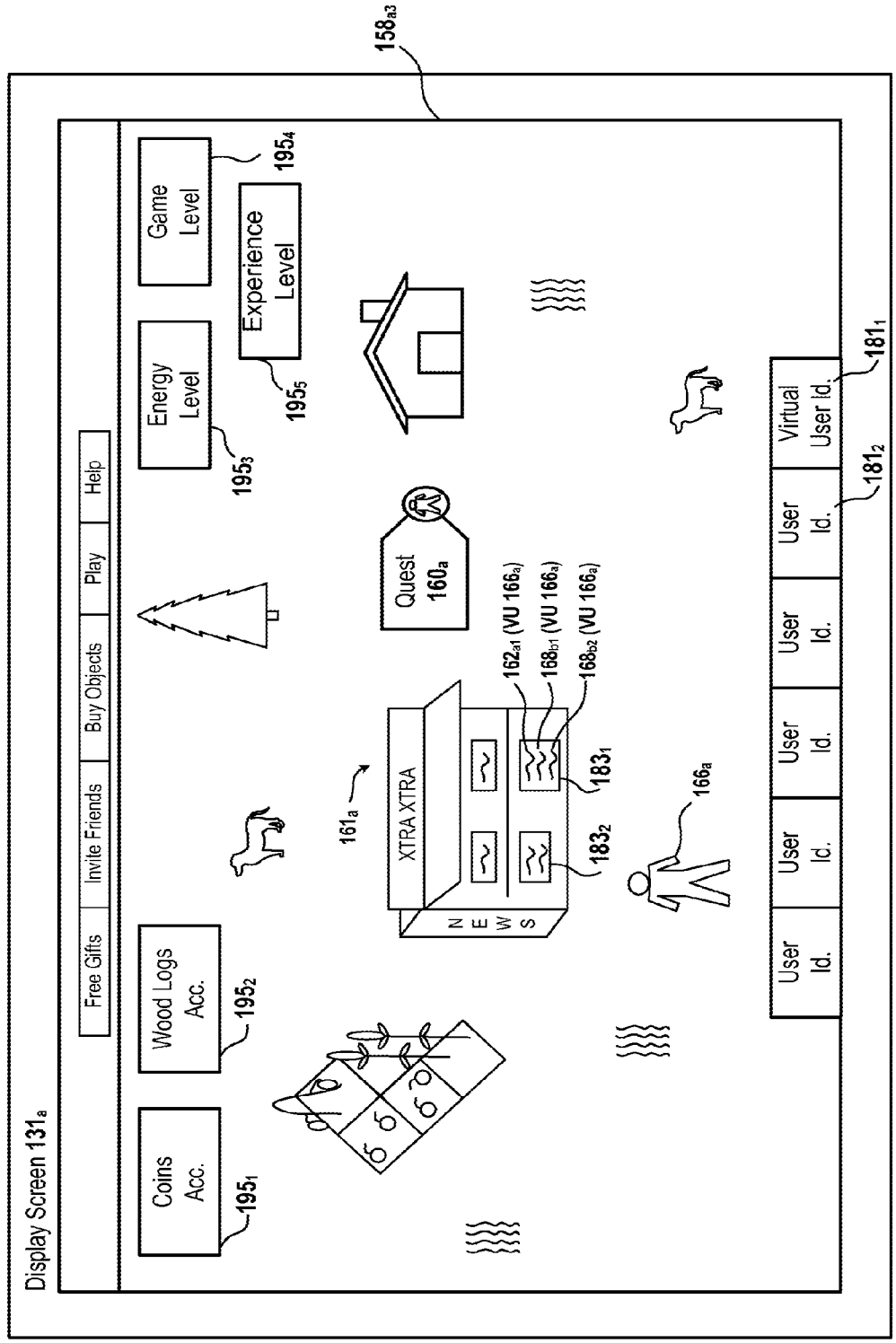
FIG. 2D is a diagram of the display screen of FIG. 2A, in accordance with one embodiment of the present invention.

FIG. 2D is a diagram of an embodiment of a display screen $131_a$ of the client device $170_a$ (FIG. 1). The display screen $131_a$ displays an environment $158_{a3}$ of the game $154_a$. The environment $158_{a3}$ is displayed when the request 164 (FIG. 1) is communicated to generate a gaming session and when the GPU of the client device $192_a$ renders the game data 121 (FIG. 1). Moreover, when the environment $158_{a3}$ is generated, the real user $170_b$ logs off the web account $156_b$ after the gaming session that is generated with the request 164. When the real user $170_b$ logs off, the environment $158_{a3}$ excludes the virtual user $166_b$.

When the real user $170_a$ logs on to another gaming session that is generated with the request 220 to play the game $154_a$ (FIG. 1), the environment $158_{a3}$ includes the virtual user $166_a$. When the real user $170_a$ logs on, the virtual user $166_a$ accepts the offer 194 and provides a response to the text communication 196. When the offer 194 is accepted, the game server 105 sends acceptance data to the client device $192_a$ and the GPU of the client device $192_a$ renders the acceptance data to display an acceptance $168_{b1}$ of the offer 194. Moreover, when the real user $170_a$ desires to post a reply $168_{b2}$ to the text communication 196 within the portion $183_1$, the real user $170_a$ selects the publication item $161_a$ with the input device of the client device $192_a$ and upon receiving an indication of the selection, the game server 105 allows the real user $170_a$ to enter the reply $168_{b2}$ within the portion $183_1$. An example of the acceptance $168_{b1}$ includes a multimedia that represents the virtual animation object that is accepted by the virtual user $166_a$. Another example of the acceptance $168_{b1}$ includes text that describes an acceptance of the gift. An example of the reply $168_{b2}$ includes text that describes a reply to the text communication 196. To illustrate, the reply $168_{b2}$ includes "Thanks for your kindness" or "I appreciate you helping me".

In other embodiments, the acceptance $168_{b1}$ and/or the reply $168_{b2}$ are displayed outside the portion $183_1$, such as within another portion of the publication item 161. In yet other embodiments, the environment $158_{a3}$ is displayed when the real user $170_a$ is still logged on to the web account $156_a$ during the gaming session that is generated with the request 152 (FIG. 1). In some embodiments in which the real user $170_b$ is still logged in the web account $156_b$ during the gaming session that is generated with the request 164, the environment $158_{a3}$ includes the virtual user $166_b$.

In various embodiments, the environment $158_{a3}$ excludes the acceptance $168_{b1}$ and/or the reply $168_{b2}$. For example, when the environment $158_{a2}$ excludes the offer 194, the environment $158_{a3}$ excludes the acceptance $168_{b1}$. As another example, when the environment $158_{a2}$ excludes the text communication 196, the environment $158_{a3}$ excludes the reply $168_{b2}$. Rather, in these embodiments, when the real user $170_a$ logs on to another gaming session that is generated with the request 220 to play the game $154_a$, the virtual animation objects that are offered in the offer 194 are added to a virtual score-keeping object, such as the score-keeping object $195_2$ or the score-keeping object $195_1$, within the environment $158_{a3}$.

Figure 3A:
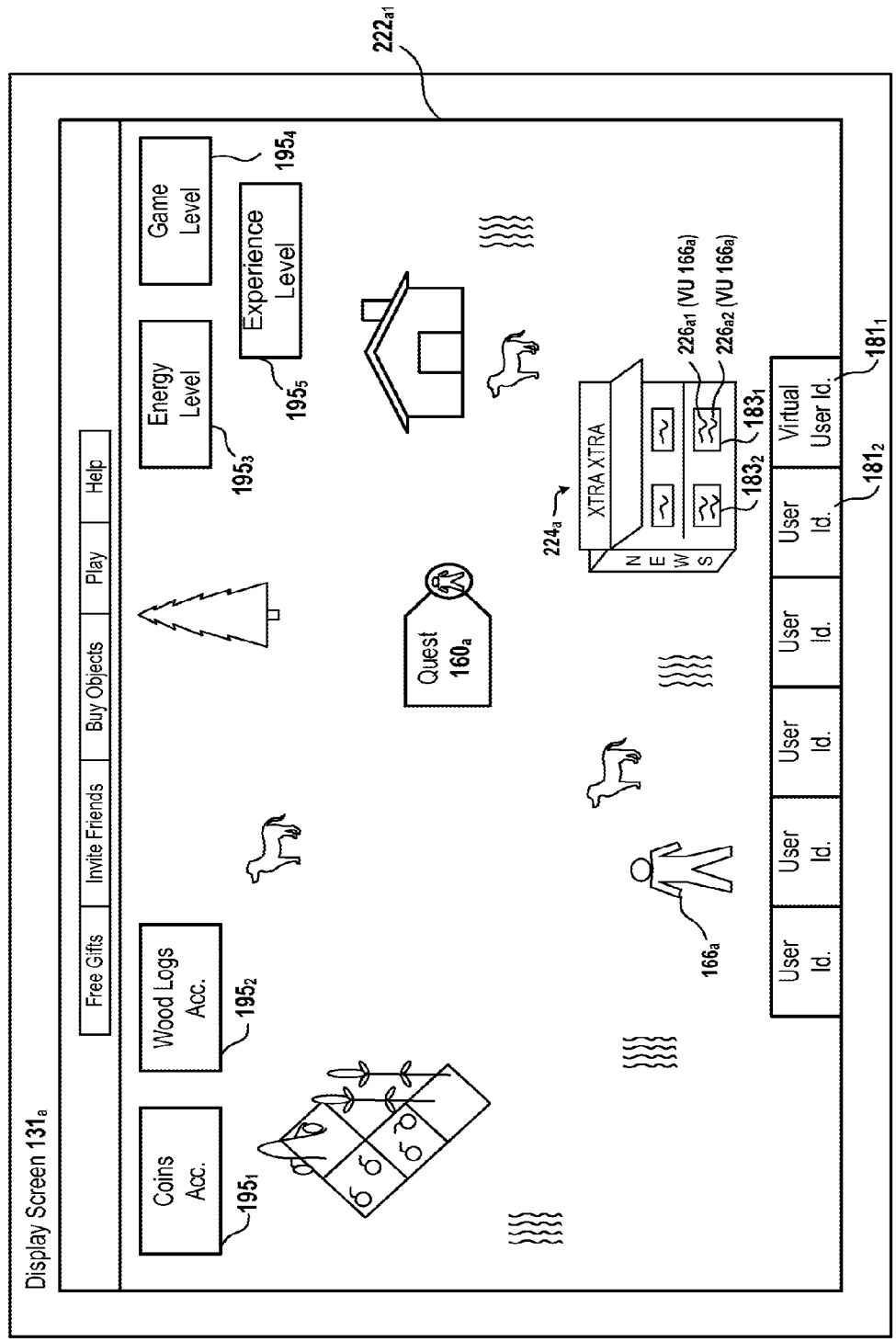
FIG. 3A is a diagram of a display screen that shows a message item within a gaming environment of a virtual user, in accordance with one embodiment of the present invention.

FIG. 3A is a diagram of an embodiment of the display screen $131_a$ of the client device $192_a$ (FIG. 1). The display screen $131_a$ displays an environment $222_{a1}$ of the game $154_a$. The environment $222_{a1}$ is displayed when the request 152 (FIG. 1) is communicated to generate a gaming session. The environment $222_{a1}$ is displayed when the GPU of the client device $192_a$ renders the game data 182 (FIG. 1).

The environment $222_{a1}$ is similar to the environment $158_{a1}$ of FIG. 2A except that the environment $222_{a1}$ includes a message item $224_a$ instead of the publication item $161_a$ (FIG. 2A). The message item $224_a$ is owned or leased by the virtual user $166_a$. The messages $226_{a1}$ and $226_{a2}$ are posted within the message item $224_a$ in a manner similar to that of posting the messages $226_{a1}$ and $226_{a2}$ within the publication item $161_a$. For example, the real user $170a$ posts the messages 226 within the message item $224_a$ via the input device of the client device $192_a$ to achieve the quest $160_a$.

The game server 105 publishes any messages posted within the message item 224$_a$ to web accounts of real users, such as real user 170$_b$, that are social network friends of the real user 170$_a$ and that are designated by the real user 170$_a$ to receive the messages. For example, when the message 226$_{a1}$ is posted within the message item 224$_a$, the game server 105 sends pop up data to the client device 192$_a$ and the GPU of the client device 192$_a$ renders the pop up data to display a pop up that includes usernames of all social network friends of the real user 170$_a$. In this example, the real user 170$_a$ selects via the input device of the client device 192$_a$ one or more of the usernames to designate web accounts that are associated within the one or more usernames for receiving the messages that are posted by the real user 170$_a$ within the message item 224$_a$. Moreover, in this example, the real user 17$_{0a}$ selects the username of the real user 170$_b$ to designate the web account 156$_b$ to receive the message 226$_{a1}$. In this example, the message 226$_{a1}$ is published by the game server 105 to a message item 224$_b$, which is described below in FIG. 3B.

In some embodiments, the game server 105 publishes any messages posted within the message item 224$_a$ to web accounts of real users, such as real user 170$_b$, that are social network friends of the real user 170$_a$ regardless of whether one or more of the social network friends are designated by the real user 170$_a$ for receiving the messages. For example, when the message 226$_{a1}$ is posted within the message item 224$_a$, the message 226$_{a1}$ is also published by the game server 105 to the message item 224$_b$, which is described below in FIG. 3B.

Figure 3B:
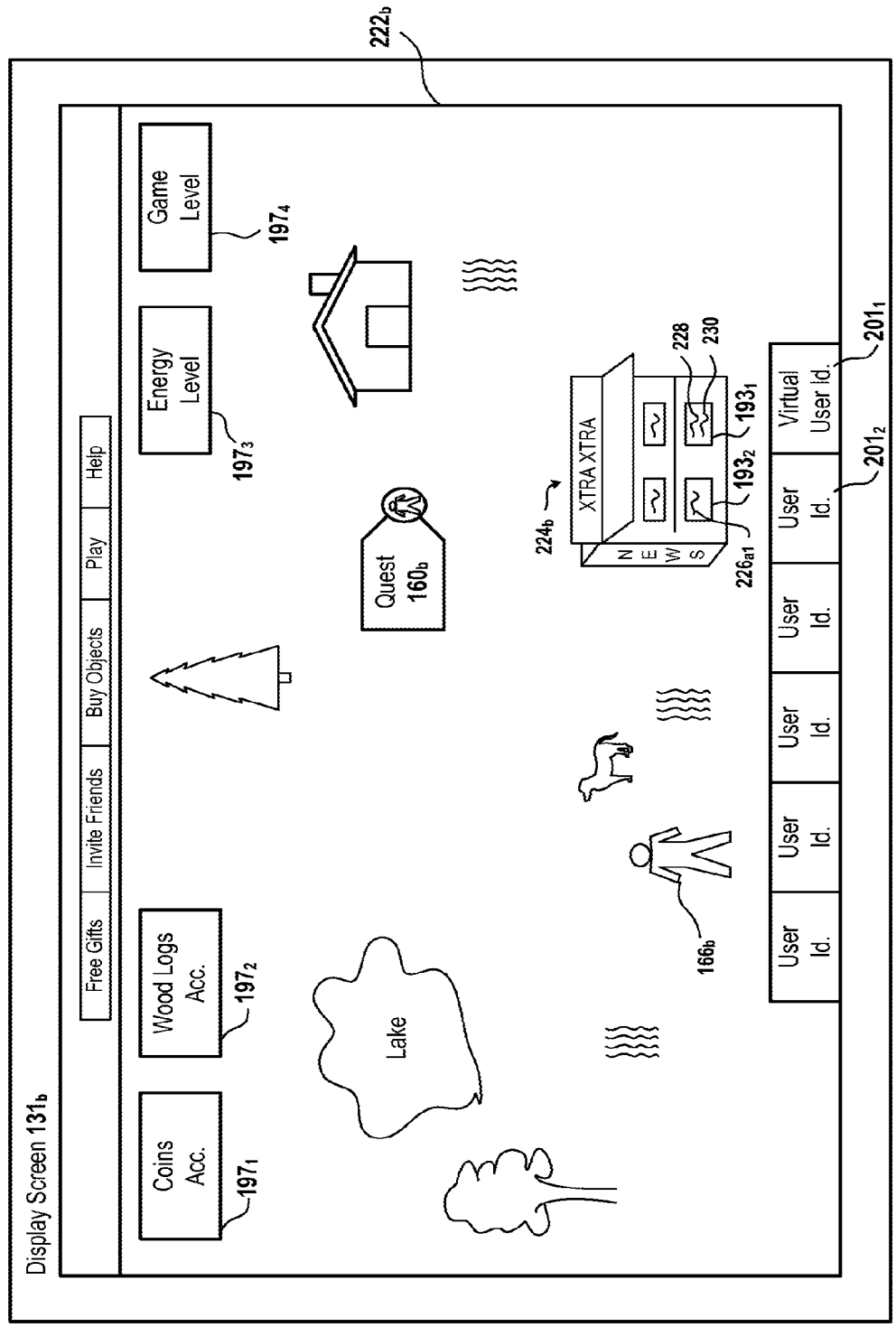
FIG. 3B is a diagram of a display screen that shows a message item within a gaming environment of another virtual user, in accordance with one embodiment of the present invention.

FIG. 3B is a diagram of an embodiment of the display screen 131$_b$ of the client device 170$_b$ (FIG. 1). The display screen 131$_b$ displays an environment 222$_b$ of the game 154$_b$ (FIG. 1). The environment 222$_b$ is displayed when the request 164 (FIG. 1) is communicated to generate a gaming session. The environment 222$_b$ is displayed when the GPU of the client device 192$_b$ renders the game data 119 (FIG. 1). The environment 222$_b$ is similar to the environment 158$_b$ of FIG. 2B except that the environment includes the message item 224$_b$ instead of the publication item 161$_b$. The message item 224$_b$ is owned or leased by the virtual user 166$_b$.

The message item 224$_b$ is selected by the real user 170$_b$ via the input device of the client device 192$_b$ to enter one or more messages within a portion 193$_1$. When the real user 170$_b$ is a social network friend of the real user 170$_a$ and when the real user 170$_a$ posts the message 226$_{a1}$ within the message item 183$_1$ (FIG. 3), the game server 105 sends message data of the message 226$_{a1}$ to the client device 192$_b$ and the GPU of the client device 192$_b$ renders the message to display the message 226$_{a1}$ within a portion 193$_2$ of the message item 224$_b$.

When the real user 170$_b$ selects the message item 224$_b$ via the input device of the client device 192$_b$, the virtual user 166$_b$ approaches the message item 224$_b$ and views the message 226$_{a1}$. For example, the game server 105 expands the message 226$_{a1}$ in a pop-up window to indicate that the virtual user 166$_b$ is reading the message 226$_{a1}$. As another example, the game server 105 sends indication data to the client device 192$_b$ and the GPU of the client device 192$_b$ renders the indication data to display an indication that the message 226$_{a1}$ is being read by the virtual user 166$_b$.

Upon reading the message 227, the real user 170$_b$ selects the message item 224$_b$ via the input device of the client device 192$_b$ and enters within the portion 193$_1$ an offer 228 for a gift and a text communication 230. The offer 228 is similar to the offer 194 (FIG. 2B) except that the offer 228 is included within the portion 193$_2$ and is not within a balloon. The text communication 230 is similar to the text communication 196 (FIG. 2B) except that the text communication 230 is included within the portion 193$_2$ and is not within a balloon.

The real user 170$_b$ selects the user ID 201$_2$. When the user ID 201$_2$ is selected, the game server 105 generates option data that is sent to the client device 192$_b$ and the GPU of the client device 192$_b$ renders the option data to display an option on the display screen 131$_b$. The option is to send the offer 228 and the text communication 230 to the real user 170$_a$. When the option is selected by the real user 170$_b$ via the input device of the client device 192$_b$, the game server 105 sends gift offer data that is rendered to display the offer 228 and text communication offer data that is rendered to display the text communication 230 to the web account 156$_a$.

Figure 3C:
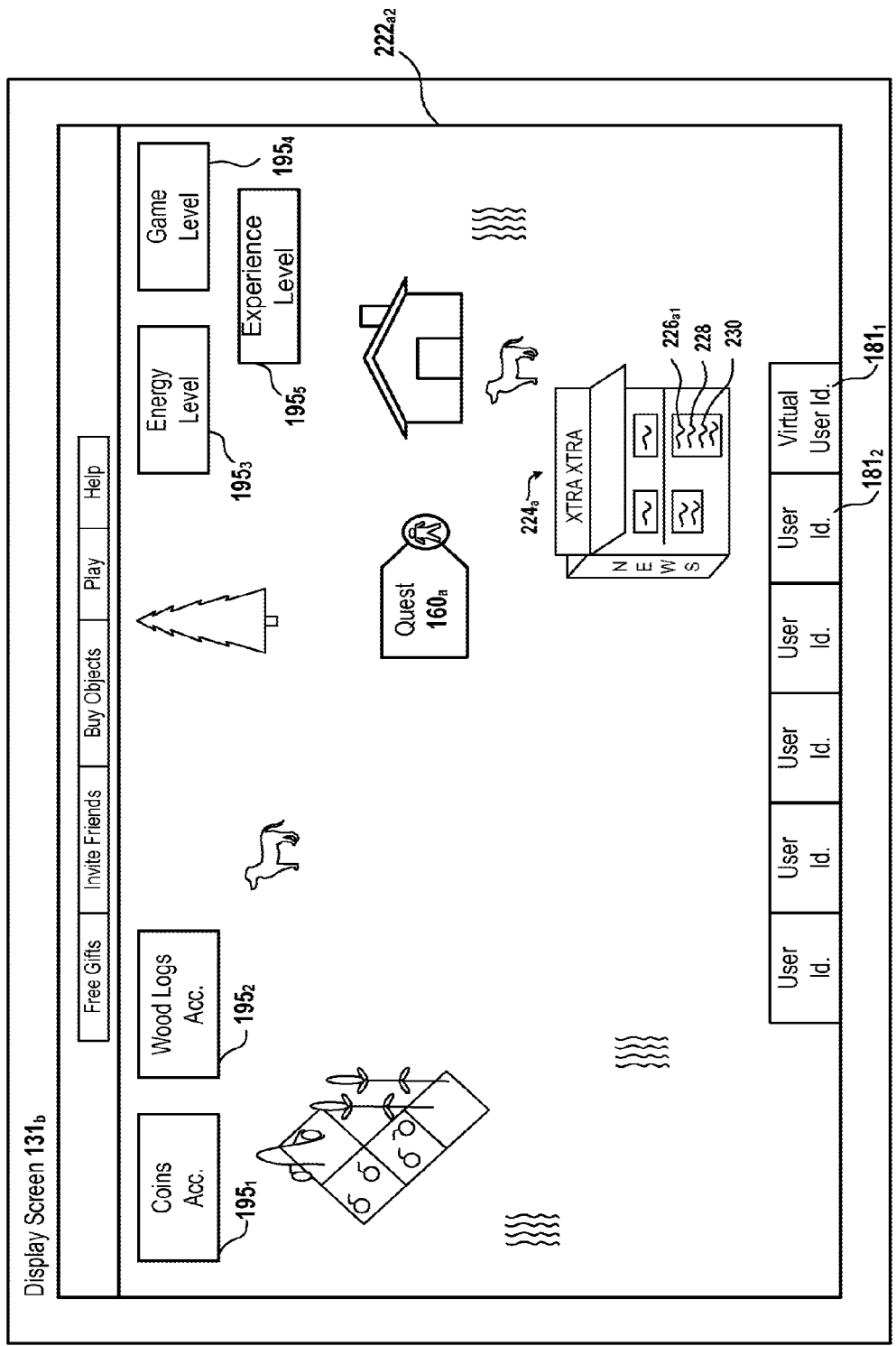
FIG. 3C is a diagram of a display screen that illustrates communication of messages between virtual users without a visit by one virtual user to another virtual user's gaming environment, in accordance with one embodiment of the present invention.

FIG. 3C is a diagram of an embodiment of the display screen 131$_b$. The display screen 131$_b$ displays an environment 222$_{a2}$ of the game 154$_a$. For example, the real user 170$_b$ selects an option, within the environment 222$_b$, to visit the environment 222$_{a2}$, via the input device of the client device 192$_b$. Upon receiving an indication that the option is selected, the game server 105 sends game data that is rendered by the GPU of the client device 192$_b$ to display the environment 222$_{a2}$. When the environment 222$_{a2}$ is displayed, the real user 170$_b$ is logged on to the web account 156$_b$ to access the gaming session that is generated with the request 164.

Moreover, after playing the game 154$_a$ during the gaming session that is generated with the request 152, the gaming session ends. As an example, after playing the game 154$_a$ during the gaming session that is generated with the request 152, the real user 170$_a$ logs off the web account 156$_a$ (FIG. 1). When the gaming session that is generated with the request 152 ends, the environment 222$_{a2}$ excludes the virtual user $_{166a}$.

The environment 222$_{a2}$ is similar to the environment 158$_{a2}$ except that the environment 222$_{a2}$ includes the message item 224$_a$ instead of the publication item 161$_a$ (FIG. 2C) and the environment 222$_{a2}$ excludes the virtual user 166$_b$. After the game server 105 sends the data for the offer 228 and text communication 230 to the web account 156$_a$, the client device 192$_a$ accesses the data from the web account 156$_a$ via the network 190 (FIG. 1). The GPU of the client device 192$_a$ renders the data for the offer 228 and text communication 230 to display the offer 228 and the text communication 230 within the message item 224$_a$. An example of the gift offered in the offer 228 includes a virtual animation object. Another example of the gift offered in the offer 228 includes a virtual animation object that is wished for in the wish list within the message item 224$_a$. Yet another example of the gift offered in the offer 228 includes a virtual animation object other than one wished for in the wish list of the message item 224$_a$.

In other embodiments, when the environment 222$_{a2}$ is displayed on the display screen 131$_b$, the real user 170$_a$ is logged on to the web account 156$_a$ to play the game 154$_a$. As an example, when the environment 222$_{a2}$ is displayed on the display screen 131$_b$, the real user 170$_a$ is logged on to the gaming session that is generated with the request 152. As another example, after the gaming session that is generated with the request 152 ends, the real user 170$_a$ regains access to the game 154$_a$. When the real user 170$_a$ is logged on, the environment 222$_{a2}$ includes the virtual user 166$_a$. Various ways of regaining access to the game after the gaming session that is generated with the request 152 ends are described above. In some embodiments, the environment $222_{a2}$ excludes the offer 228 or the text communication 230.

Figure 3D:
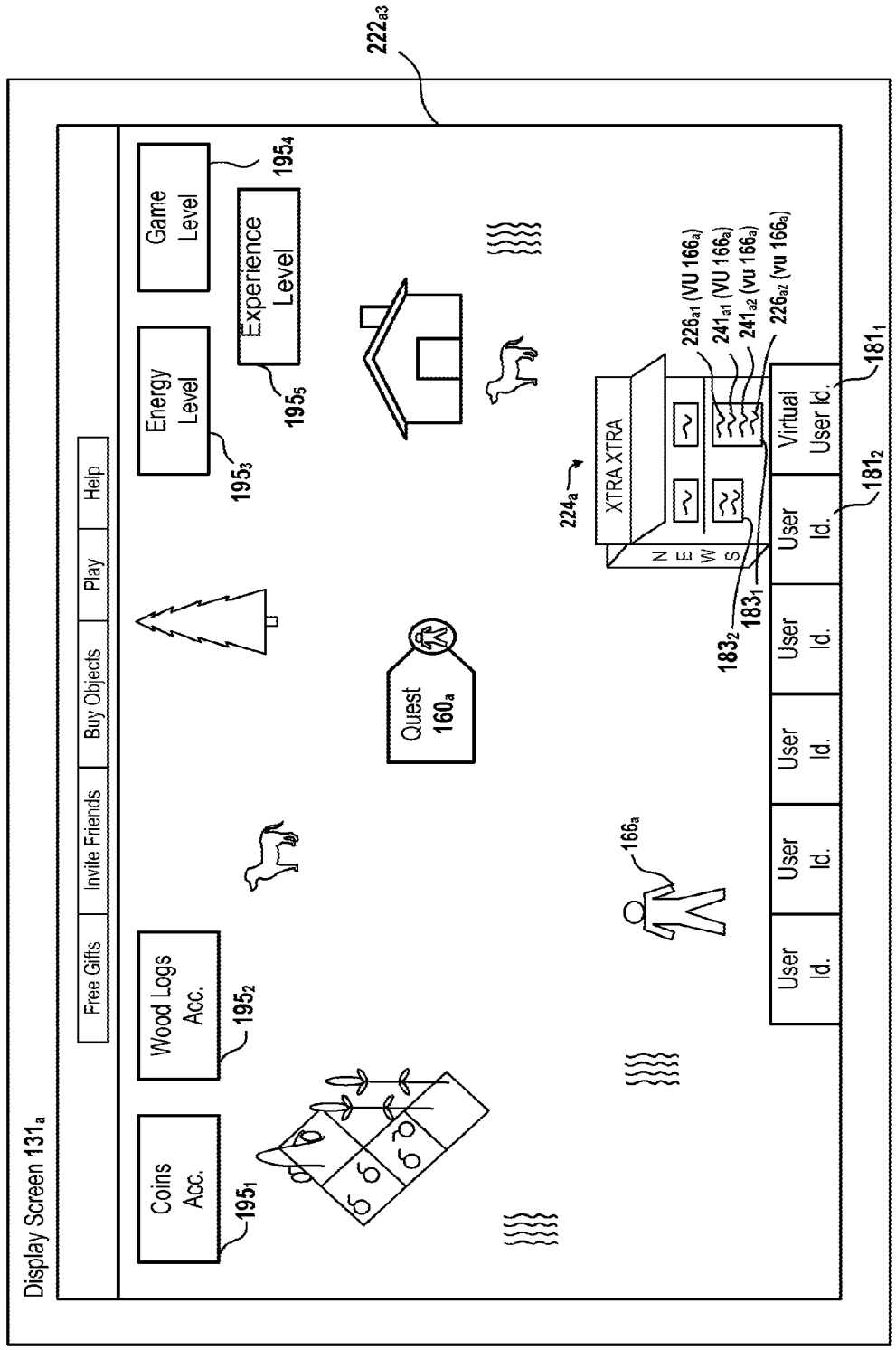
FIG. 3D is a diagram of the display screen of FIG. 3A, in accordance with one embodiment of the present invention.

FIG. 3D is a diagram of an embodiment of a display screen $131_a$ of the client device $170_a$ (FIG. 1). The display screen $131_a$ displays an environment $222_{a3}$ of the game $154_a$. The environment $222_{a3}$ is displayed when the request 220 (FIG. 1) is communicated to generate a gaming session and when the GPU of the client device $192_a$ renders the game data 121. Moreover, when the environment $222_{a3}$ is generated, the real user $170_b$ logs off the web account $156_b$ after the gaming session that is generated with the request 164. The environment $222_{a3}$ is similar to the environment $158_{a3}$ (FIG. 2D) except that the environment $222_{a3}$ includes the message item $224_a$ instead of the publication item $161_a$.

When the real user $170_a$ logs on to another gaming session that is generated with the request 220 to play the game $154_a$, the environment $222_{a3}$ includes the virtual user $166_a$. When the offer 228 and the text communication 230 are displayed, the game server 105 sends acceptance data to the client device 192a and the GPU of the client device $192_a$ renders the acceptance data to display an acceptance $241_{a1}$ of the offer 228 by the virtual user $166_a$. As an example, the acceptance $241_{a1}$ includes a multimedia representing the virtual animation object that is offered in the offer 228. The acceptance $241_{a1}$ is displayed within the portion $183_1$.

When the acceptance $241_{a1}$ is displayed, the real user 170a can select the message item $224_a$ via the input device of the client device 192a. When the selection is received by the game server 105, the game server 105 allows the real user $170_a$ to enter a reply $241_{a2}$ within the message item $224_a$. The reply $241_{a2}$ is a reply to the text communication 230. An example of the reply $241_{a2}$ includes text, such as, "thanks for the gift" or "Thank you so much for the wood". The reply $241_{a2}$ is displayed within the portion $183_1$.

In some embodiments, instead of being displayed within the portion $183_1$, the acceptance $241_{a1}$ and the reply $241_{a2}$ are displayed within another portion, such as portion $183_2$, of the message item $224_a$. In other embodiments, data that is rendered to display the acceptance $241_{a1}$ and/or the reply $241_{a2}$ is published by the game server 105 to the web account $156_b$ of the real user $170_b$. For example, when the real user $170_b$ is logged on to the gaming session that is accessed with the request 164 or regains access to the game $154_b$ after the gaming session ends, the client device $192_b$ requests the data that is rendered to display the acceptance $241_{a1}$ and/or reply $241_{a2}$ and the data is rendered by the GPU of the client device $192_b$ within the message item $224_b$ on the display screen $131_b$ (FIG. 3B).

In some embodiments, when the environment $222_{a3}$ is generated, the real user $170_a$ is still logged in the web account $156_a$ during the gaming session that is generated with the request 152 (FIG. 1).

In various embodiments, the environment $222_{a3}$ excludes the acceptance $241_{a1}$ and/or the reply $241_{a2}$. For example, when the environment $222_{a2}$ excludes the offer 228, the environment $222_{a3}$ excludes the acceptance $241_{a1}$. As another example, when the environment $222_{a2}$ excludes the text communication 230, the environment $222_{a3}$ excludes the reply $241_{a2}$. Rather, in these embodiments, when the real user $170_a$ logs on to another gaming session that is generated with the request 220 to play the game $154_a$, the virtual animation objects that are offered in the offer 228 are added to a virtual score-keeping object, such as the score-keeping object $195_2$ or the score-keeping object $195_1$, within the environment $222_{a3}$.

Figure 4A:
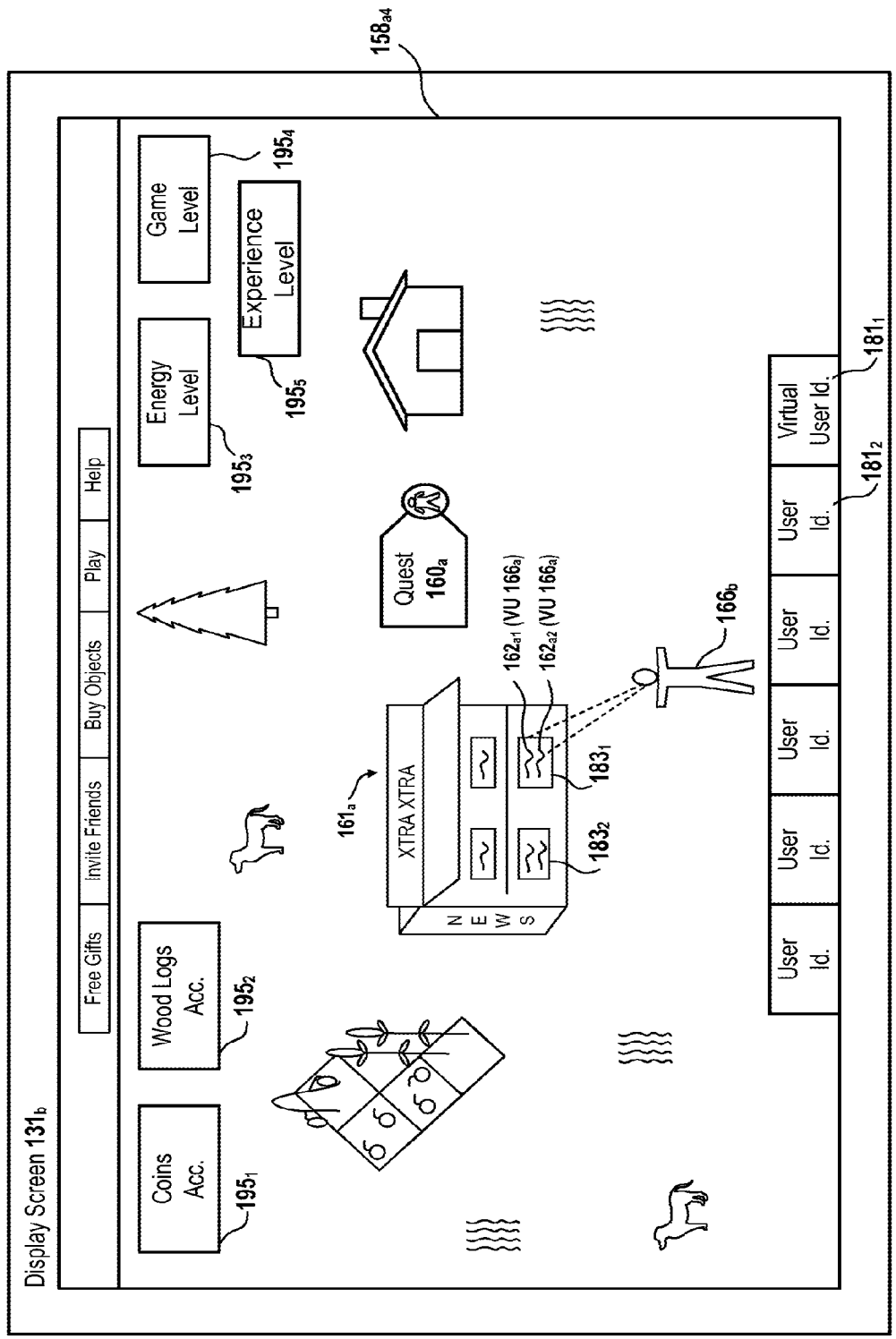
FIG. 4A is a diagram of a display screen that shows a virtual user visiting a gaming environment of another virtual user, in accordance with one embodiment of the present invention.

FIG. 4A is a diagram of an embodiment of the display screen $131_b$. The display screen $131_b$ displays an environment $158_{a4}$ of the game $154_a$. The environment $158_{a4}$ is displayed on the display screen $131_b$ when the virtual user $166_b$ visits the environment $158_{a1}$ of FIG. 2A. For example, when the real user $170_b$ selects the visit option of the environment $158_b$ (FIG. 2B), the game server 105 sends game data to the client device $192_b$ and the GPU of the client device $192_b$ renders the game data to generate the environment $158_{a4}$. The environment $158_{a4}$ is similar to the environment $158_{a2}$ (FIG. 2C) except that the offer 194 and the text communication 196 are not displayed within balloons on top of the virtual user $166_b$.

Moreover, after playing the game $154_a$ during the gaming session that is generated with the request 152 (FIG. 1), the gaming session ends. As an example, after playing the game $154_a$ during the gaming session that is generated with the request 152, the real user $170_a$ logs off the web account $156_a$ (FIG. 1). When the gaming session that is generated with the request 152 ends, the environment $158_{a4}$ excludes the virtual user $166_a$.

When the real user $170_b$ selects the publication item $161_a$ via the input device of the client device $192_b$ (FIG. 1), the virtual user $166_b$ approaches the publication item 161a and views the messages $162_{a1}$ and $162_{a2}$. For example, when the real user $170_b$ selects the publication item $161_a$, the virtual user $166_b$ walks to the publication item $161_a$ and the publication item $161_a$ is within a line of sight of the virtual user $166_b$ to allow the virtual user $166_b$ to view the messages $162_{a1}$ and $162_{a2}$. The game server 105 determines that the virtual user $166_b$ cannot fulfill the wish in the message $162_{a1}$ of the virtual user $166_a$. For example, the message $162_{a1}$ includes that the virtual user $166_a$ wishes to obtain wood logs and the game server 105 determines that the virtual user $166_b$ does not have wood logs within the environment $158_b$ (FIG. 2B). As another example, the message $162_{a1}$ includes that the virtual user $166_a$ wishes to obtain a thousand seeds and the game server 105 determines that the virtual user $166_b$ has less than a thousand seeds within the environment $158_b$.

In other embodiments, the real user $170_a$ is logged on to play the game $154_a$ when the virtual user $166_b$ visits the environment $158_{a1}$ to generate the environment $158_{a4}$. As an example, when the virtual user $166_b$ visits the environment $158_{a1}$ to generate the environment $158_{a4}$, the real user $170_a$ is logged on to the gaming session that is generated with the request 152. In these embodiments, the environment $158_{a4}$ includes the virtual user $166_a$.

Figure 4B:
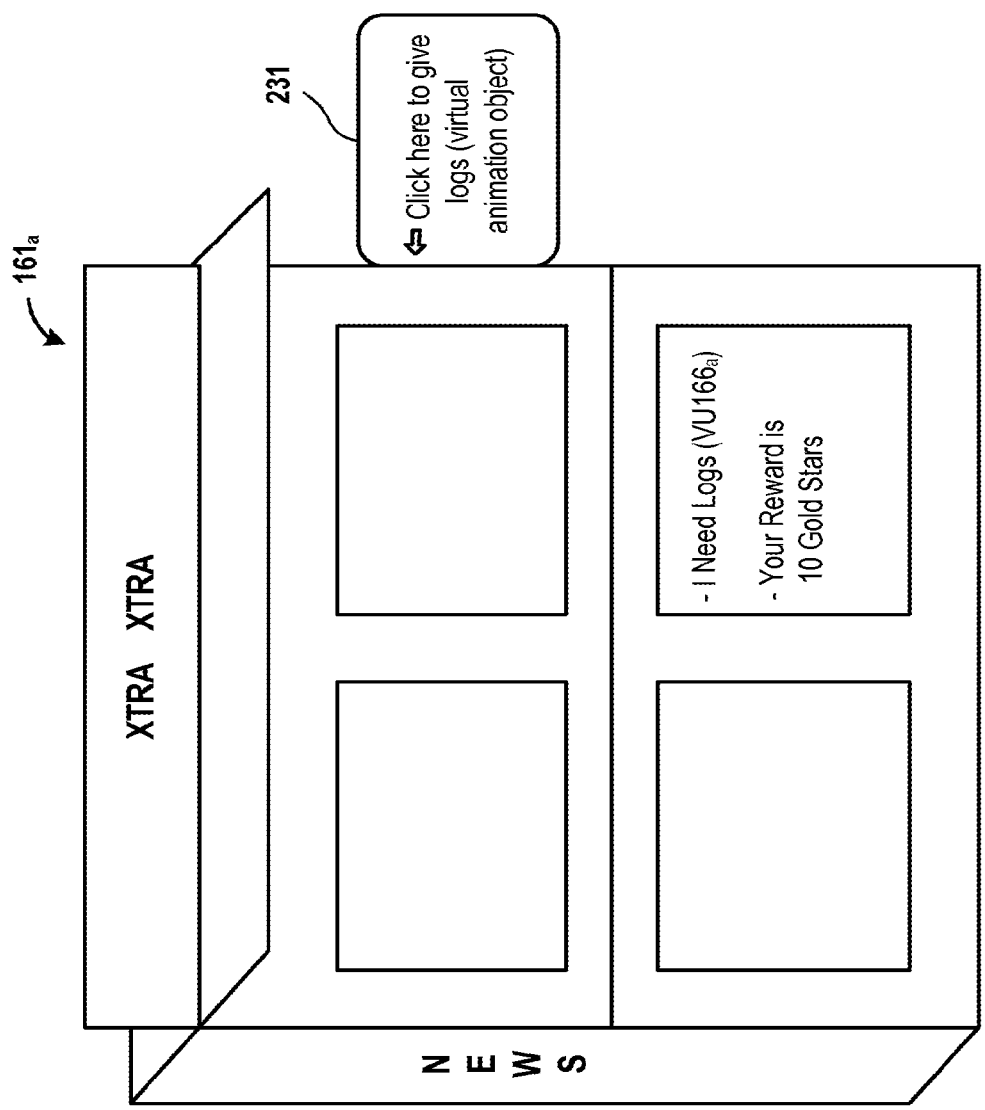
FIG. 4B is a diagram of a publication item that is displayed on the display screen of FIG. 4A when the virtual user is within the environment of FIG. 4A and has viewed the publication item, in accordance with one embodiment of the present invention.

FIG. 4B is a diagram of an embodiment of the publication item $_{161a}$ that is displayed on the display screen $131_b$ when the virtual user $166_b$ is within the environment $158_{a4}$ and has viewed the publication item $161_a$. Upon determining that the virtual user $166_b$ cannot fulfill the wish of the virtual user $166_a$, the game server 105 sends option data to the client device $192_b$ and the GPU of the client device $192_b$ renders the option data to generate an option 231.

When the option 231 is interfaced with by the real user $170_b$ via the input device of the client device $192_b$, the game server 105 determines whether the interfacing action meets a threshold. For example, the game server 105 determines whether the interfacing action includes a selection of the publication item $161_a$ or a hovering over the publication item $161_a$. In this example, the game server 105 determines that the hovering action does not meet the threshold and the selection action meets the threshold. When the interfacing action meets the threshold, the virtual user $166_a$ receives an amount of virtual animation objects to fulfill the wishes of the virtual user $166_a$. For example, when the interfacing action meets the threshold, the game server 205 adds the amount of virtual animation objects to a score-keeping object of the environment $158_{a4}$ (FIG. 4A). On the other hand, when the interfacing action does not meet the threshold, the virtual user $166_a$ does not receive virtual animation objects to fulfill the wishes of the virtual user $166_a$.

In other embodiments, when the interfacing action meets the threshold, a message that includes multimedia representing the amount of virtual animation objects is included within the publication item $161_a$. In some embodiments, when the interfacing action meets the threshold, the score-keeping object of the environment $158_{a4}$ is updated to include the number of virtual animation objects and the message is included within the publication item $161_a$.

Moreover, in addition to the virtual user $166_a$ receiving the amount of virtual animation objects, the virtual user $166_b$ receives a reward for helping the virtual user $166_a$. The reward is a virtual animation object or multiple virtual animation objects. For example, the virtual user $166_b$ receives ten gold stars or 20 coins or 10 goats, or a combination thereof. The reward is added by the game server 105 to a score-keeping object of the environment $158_b$ (FIG. 2B). In some embodiments, a message indicating that the virtual user $166_b$ has received an amount of virtual animation objects as a reward is displayed within the publication item $161_b$ (FIG. 2B).

In other embodiments, upon determining that the virtual user 166b cannot fulfill the wish of the virtual user $166_a$, the game server 105 sends option data to the client device $192_b$ and the GPU of the client device $192_b$ renders the option data to generate an option, other than the option 231, within the publication item $161_a$. The other option indicates to the real user 170b that the virtual user $166_b$ can perform a virtual service to obtain a number of virtual products that are in the wish list of the virtual user $166_a$. When the real user $170_b$ selects the other option via the input device of the client device $192_b$, the game server 105 allows the virtual user $166_b$ to provide the virtual service to the virtual user $166_a$ and provides, in return, the number of virtual products to the virtual user $166_b$. The virtual user $166_b$ offers the number of virtual products to the virtual user $166_a$ that accepts the virtual products.

Although the option 231 includes logs, in some embodiments, the option 231 includes any other virtual animation object. In other embodiments, the real user $170_a$ is logged on to play the game $154_a$ when the virtual user $166_b$ visits the environment $158_{a1}$ to generate the environment $158_{a4}$. As an example, when the virtual user $166_b$ visits the environment $158_{a1}$ to generate the environment $158_{a4}$, the real user $170_a$ is logged on to the gaming session that is generated with the request 152. In these embodiments, the environment $158_{a2}$ includes the virtual user $166_a$.

In yet other embodiments, regardless of whether the real user $170_a$ is logged on to play the game 154 when the virtual user $166_b$ visits the environment $158_{a1}$ to generate the environment $158_{a4}$, the environment $158_{a4}$ includes the virtual user $166_a$.

Figure 5:
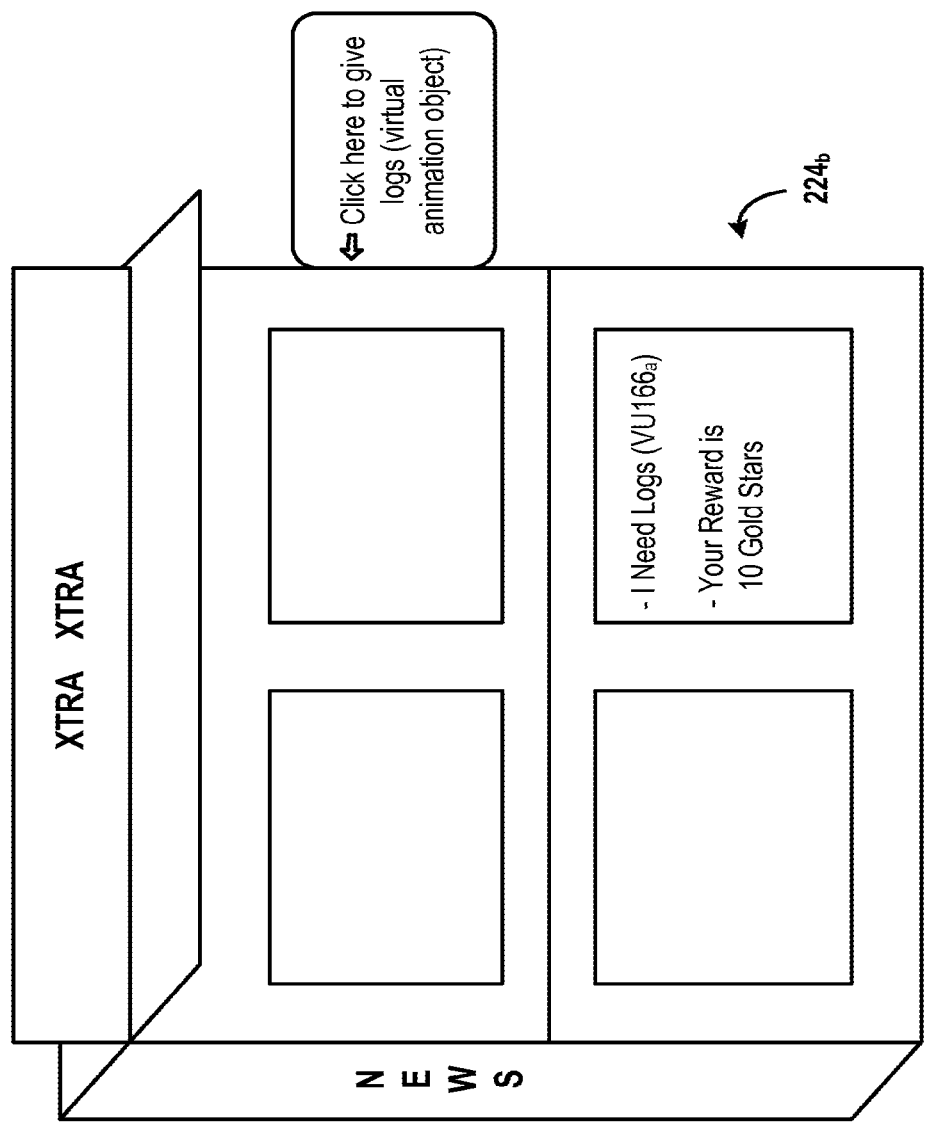
FIG. 5 is a diagram of an embodiment of a message item that is displayed on a display screen when a virtual user does not visit a gaming environment of another virtual user, in accordance with one embodiment of the present invention.

FIG. 5 is a diagram of an embodiment of the message item $224_b$ that is displayed on the display screen $131_b$ when the virtual user $166_b$ is within the environment $158_{a4}$. The message item $224_b$ functions in a manner similar to that of the publication item $161_a$ of FIG. 4B except that the virtual user $166_b$ does not view the message item $224_b$ to provide a virtual animation object to the virtual user $166_a$.

In several embodiments, an amount of virtual animation objects that are provided by the virtual user $166_b$ in response to a wish of the virtual user $166_a$ are greater when the virtual user $166_b$ visits the environment $158_{a1}$ (FIG. 2A). The amount is greater than an amount of virtual animation objects that are provided by the virtual user $166_b$ in response to a wish of the virtual user $166_a$ when the virtual user $166_b$ does not visit the environment $158_{a1}$. For example, in the embodiment described in FIG. 3C, the virtual user $166_b$ does not visit the environment $222_{a1}$ and in the embodiment described in FIG. 2C, the virtual user $166_b$ visits the environment $158_{a1}$. In this example, an amount of virtual animation objects that are offered in the offer 194 (FIG. 2C) is greater than an amount of virtual animation objects that are offered in the offer 228. As another example, in the embodiment described in FIG. 5, the virtual user $166_b$ does not visit the environment $158_{a1}$ and in the embodiment described in FIG. 4B, the virtual user $166_b$ visits the environment $158_{a1}$. In this example, an amount of virtual animation objects that are provided to the virtual user $166_a$ in the embodiment of FIG. 4B is greater than an amount of virtual animation objects that are provided in the embodiment of FIG. 5.

It should be noted that although an amount of virtual animation objects are shown in the environments described herein, in some embodiments, each environment includes any amount of virtual animation objects. For example, the environment $158_{a1}$ includes any number of virtual users and/or any number of virtual structures. Moreover, although types of virtual score-keeping objects are shown in the environments described herein, in various embodiments, each environment includes any type of virtual score-keeping objects. For example, the environment $158_{a1}$ includes a virtual score-keeping object that includes an amount of food that is accumulated by a virtual user during play of a game.

In other embodiments, a virtual environment includes any number of virtual game objects. For example, the virtual environment $158_{a1}$ includes a higher number of virtual trees than that shown in FIG. 2A, a higher number of virtual animals than that shown in FIG. 2A, and/or a higher number of virtual users than that shown in FIG. 2A. As another example, the virtual environment $158_{a1}$ includes a higher number of virtual score-keeping objects than that shown in FIG. 2A. As yet another example, the virtual environment $158_{a1}$ includes an amount of grass accumulated during play of a game. In other embodiments, any of the environments described herein include any number of buttons, such as user ID buttons.

It is noted that in some embodiments, the user IDs $181_1$, $181_2$, $201_1$, and $201_2$ are assigned by the SNS 103, by the game server 105 (FIG. 1), or a combination thereof, to the corresponding real and virtual users. For example, the real user ID $201_2$ is assigned to the real user $170_a$ by the SNS 103 and the virtual user ID $181_2$ is assigned by the game server 105. As another example, all the user IDs $181_1$, $181_2$, $201_1$, and $201_2$ are assigned by the game server 105.

It is further noted that an environment is displayed on a display screen of a client device when the game server 105 sends game data to the client device and a GPU of the client device renders the game data to generate the environment.

It should be noted that in some embodiments, in the embodiments described above with reference to FIGS. 3A thru 3D and FIG. 5, the virtual user $166_b$ is not allowed by the game server 105 to visit the environment $158_{a1}$ of the virtual user $166_a$.

Moreover, in various embodiments, the virtual animation objects of the environments $158_{a1}$, $158_{a2}$, $158_{a3}$, $158_{a4}$, $222_{a1}$, $222_{a2}$, and $222_{a3}$ are owned by the virtual user $166_a$ and the virtual animation objects of the environments $158_b$ and $222_b$ are owned by the virtual user $166_b$. Of course, when a virtual user visit an environment owned by another virtual user, the other virtual user does not own the visiting virtual user. In other embodiments, the virtual animation objects of the environments $158_{a1}$, $158_{a2}$, $158_{a3}$, $158_{a4}$, $222_{a1}$, $222_{a2}$, and $222_{a3}$ are leased by the virtual user $166_a$ and the virtual animation objects of the environments $158_b$ and $222_b$ are leased by the virtual user $166_b$.

Various embodiments of the present invention are described using text. In other embodiments, any other form of multimedia is used instead of text.

Figure 6:
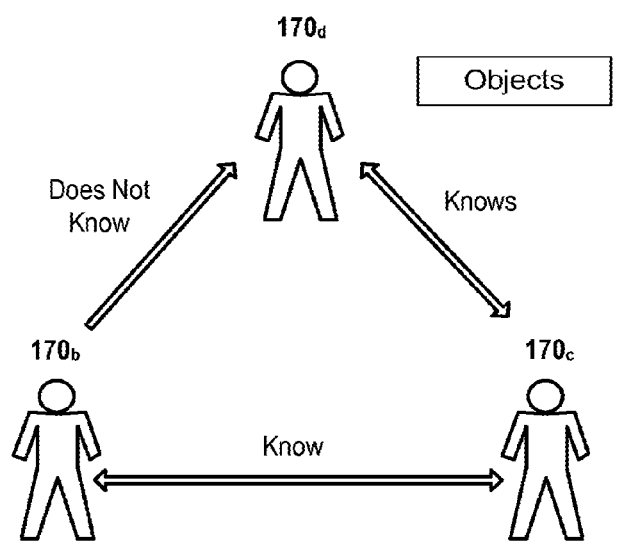
FIG. 6 is a diagram of an embodiment that is used to illustrate use of a social network in obtaining an amount of a virtual animation object that a virtual user lacks, in accordance with one embodiment of the present invention.

FIG. 6 is a diagram of an embodiment that is used to illustrate use of a social network in obtaining an amount of a virtual animation object that the virtual user $166_b$ lacks. As shown in FIG. 6, the real user $170_b$ knows another real user $170_c$ and does not know a real user $170_d$. A real user knows another real user when both the real users are friends in a social network service that is offered by the SNS 103 (FIG. 1). The real user $170_c$ does not have the amount of the virtual animation object that can be used to fulfill a wish of the virtual user $166_a$. The real user $170_c$ knows the real user $170_d$.

Upon determining that message data that is rendered to display the message $162_{a1}$ (FIGS. 2A & 4A) or the message $226_{a1}$ (FIG. 3A) is received, the game server 105 determines that the virtual user $166_b$ lacks the amount of the virtual animation object that is wished for by the virtual user $166_a$. The game server 105 communicates with the SNS 103 to display a list of friends of the real user $170_b$ on the client device $192_b$ with a prompt. The prompt indicates to the real user $170_b$ whether the real user $170_b$ desires to contact his/her social network friends via the SNS 103 to determine whether any of those friends have the amount of the virtual animation object. Upon receiving a selection via the input device of the client device $192_b$ indicating that the real user $170_b$ wishes to contact his/her social network friends, the SNS 103 posts a message within web accounts of the friends. The message posted indicates that the real user $170_b$ desires to have the amount of virtual animation objects.

When the friends, such as the real user $170_c$, of the real user $170_b$ also lack the number of virtual animation objects, the friends contact their friends via the SNS 103. If any of the friends, such as the real user $170_d$, have the number of virtual animation objects, the friend responds to the real user $170_c$ to indicate that he/she has the amount of the virtual animation object. The real user $170_c$ receives the amount of virtual animation object via a game environment from the real user $170_d$ and provides the amount to the virtual user $166_b$ via a game environment. The virtual user $166_b$ then helps the virtual user $166_a$ with the amount of the virtual animation object.

Figure 7:
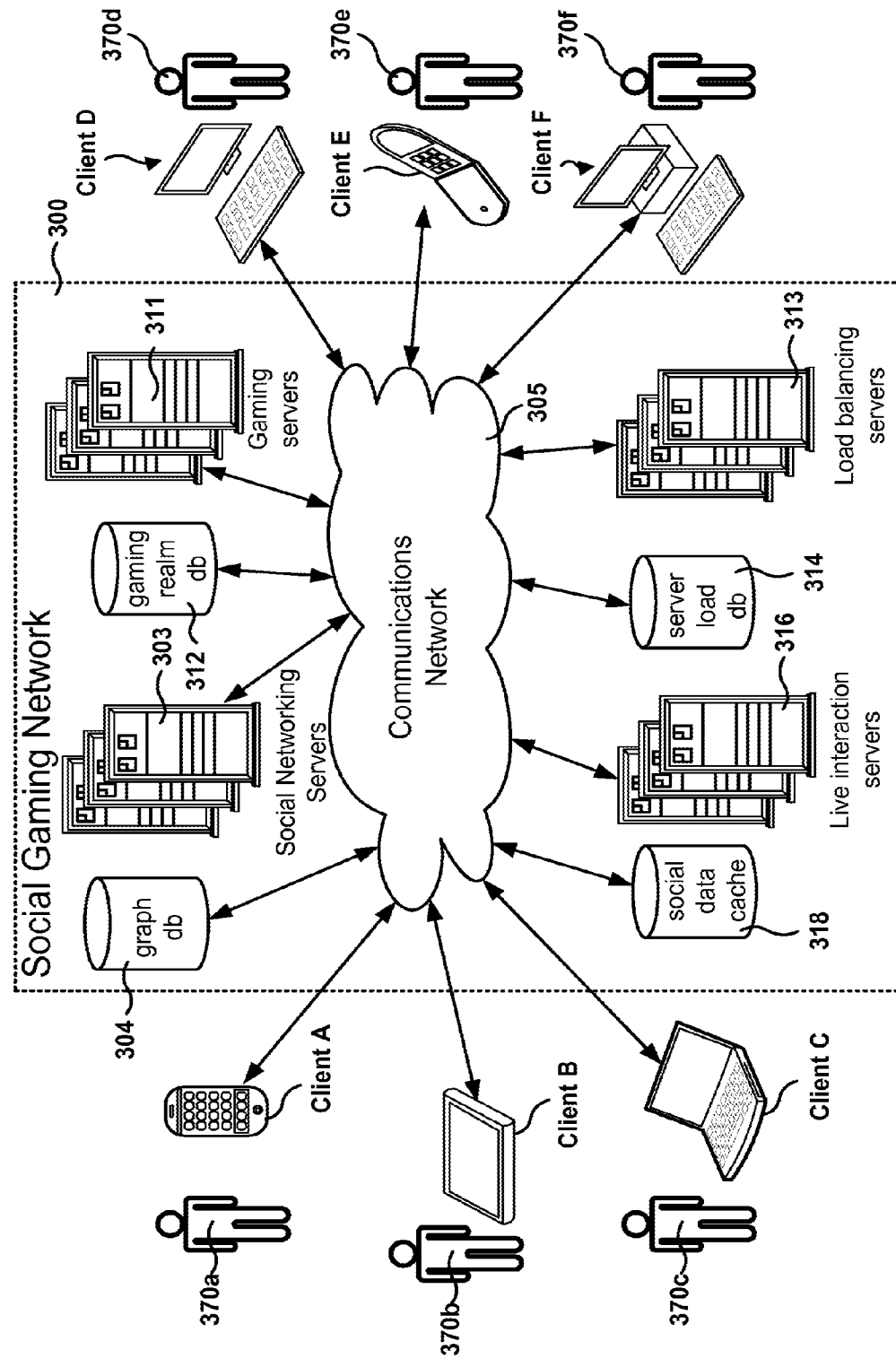
FIG. 7 is a block diagram illustrating a social gaming network architecture, according to one embodiment of the present invention.

FIG. 7 is a block diagram illustrating a social gaming network architecture, according to one embodiment. In some implementations, a plurality of players (e.g., $370_a$-$370_f$) may be utilizing a social gaming network 300. The players 370 are examples of the real users 170 (FIG. 1). For example, the player $370_a$ is an example of the real user $170_a$ (FIG. 1), the player $370_b$ is an example of the real user $170_b$ (FIG. 1), the player $370_c$ is an example of the real user $170_c$ (FIG. 6) and the player $370_d$ is an example of the real user $170_d$ (FIG. 6).

Each player interacts with the social gaming network 300 via one or more client devices (e.g., client devices A thru F). The client devices may communicate with each other and with other entities affiliated with the gaming platform via a communications network 305, which is an example of the network 190 (FIG. 1). Further, the players 370 may be utilizing a social networking service provided by a social networking server (e.g., social networking servers 303) to interact with each other.

When a player provides an input into the player's client device, the client device may in response send a message via the communications network to the social networking server. The social networking server may update the player profile, save the message to a database, send messages to other players, etc. The social gaming network 300 may include a social graph database 304, which stores player relationships, social player profiles, player messages, and player social data.

The gaming servers 311 host one or more game applications, and perform the computations necessary to provide gaming features to the players 370 and client devices A thru F. One or more gaming realm databases 312 store data related to the gaming services, such as the game applications and modules, virtual gaming environment ("realm") data, player gaming session data, player scores, player virtual gaming profiles, game stage levels, etc. The gaming servers 303 may utilize the data from the gaming realm databases to perform the computations related to providing gaming services for the players 370. In some implementations, a server load database 314 stores gaming server load statistics, such as computational load, server responses times, etc.

The social gaming network 300 may include one or more load balancing servers 313 and one or more live interaction servers 316. The live interaction servers 316 monitor which players are online, and determine if a player's neighbors are currently online. This allows live interactions between players 370, as described below in more detail with reference to FIG. 8. In one embodiment, a social data cache 318 stores some of the graph data related to player game links (e.g., neighbors) for fast access to the social data.

Figure 8:
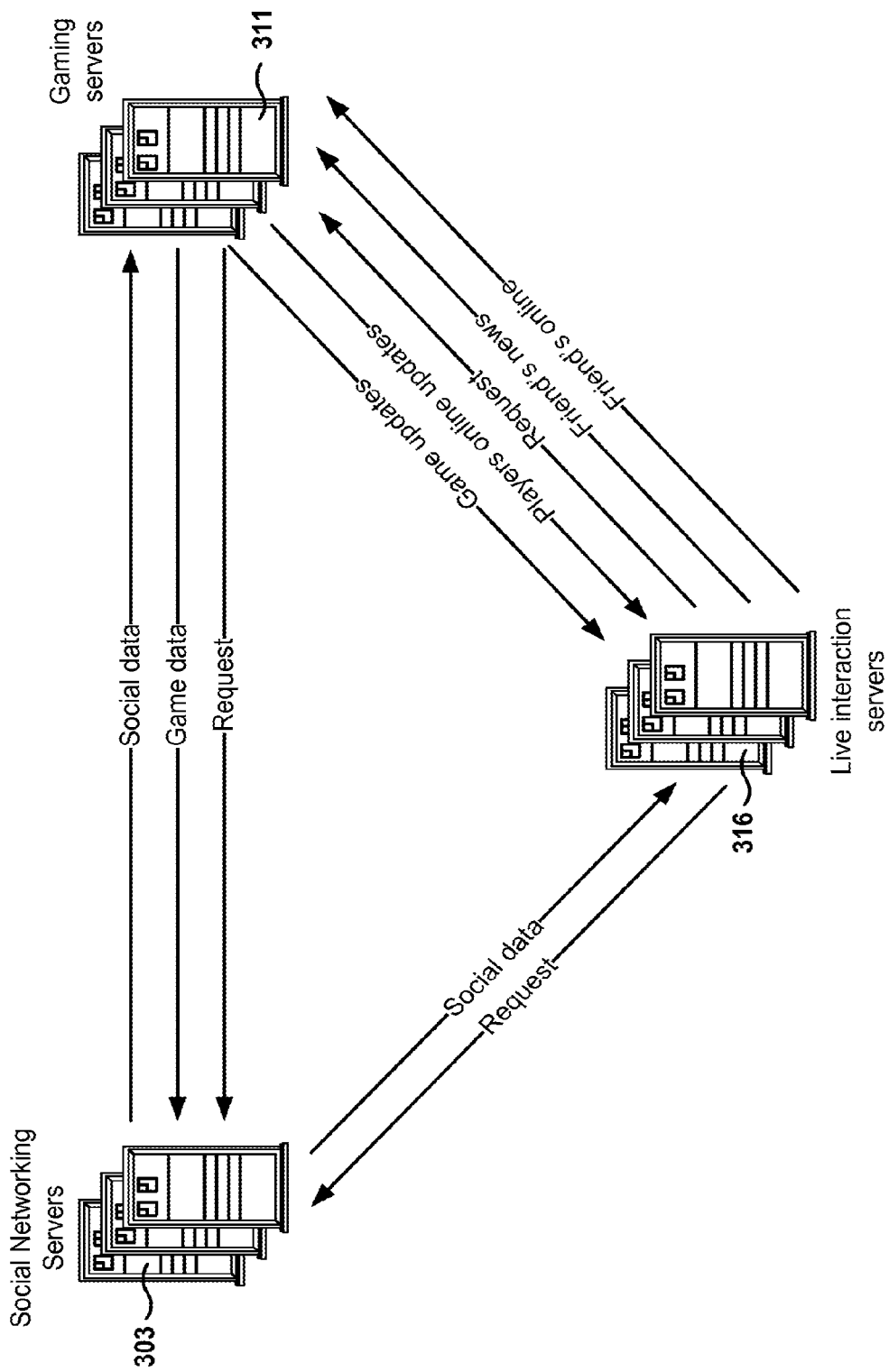
FIG. 8 illustrates the interactions between the servers of FIG. 7, in accordance with one embodiment of the present invention.

FIG. 8 illustrates the interactions between the servers of FIG. 5, in accordance with one embodiment of the present invention. As described above, social networking servers 303 collect social data regarding the players. This social data is made available to gaming servers 311 and live interaction servers 316. The social data might be sent periodically, without a request for data, or may be sent as the result of a request sent from the gaming servers 311 or the live interaction servers 316.

The gaming servers 311 are used to execute the online games and hold the gaming data, which can be shared with social networking servers 303 and live interaction servers 316. The game data (e.g., game updates) may be sent periodically, without responding to a request, or might be sent in response to a request, or might be sent in combination ("piggy-backed") with other information exchanged between the servers (e.g., game progress or activities data). In one embodiment, live interaction servers 316 periodically poll gaming servers 311 requesting the list of players 370 that are online playing the game, or the list of neighbors of a particular player that are currently online. In one embodiment, polling is performed every 15 seconds, and in another embodiment, the polling interval is in the range between 5 seconds and 5 minutes, although other values are also possible.

In one embodiment, communications between the players 370 are managed by the live interaction servers 316. A first player knows that a second player is online because the live interaction servers 316 have notified the first player that the second player is online playing the game (of course the first player and the second player are friends in the online game). When the first player sends a message to the second player, the game of the first player sends the message to the live interaction servers 316, which forward the message to the game of the second player. Similarly, when the second player wants to send a message to the first player, the message is sent through live interaction servers 316.

In another embodiment, the game update information sent by the gaming servers 311 includes information regarding the players 370 playing a particular game, as well as information regarding users that are playing other online games. This way, a player may receive information about the neighbors that are playing the same online game, or about the neighbors that are playing other online games. The game updates sent from the gaming servers 311 include information regarding the status of the neighbor's game. The status may include score, current activities, requests for help, recent progress made in the game, sign-on and sign-off information, etc.

Live interaction servers 316 keep track of which neighbors are online at a given time. Live interaction servers 316 analyze the game updates received from gaming servers 311 and create social game data to inform users of neighbor's activities. These activities may include information on which neighbors are online, neighbor's recent activities (e.g., game progress), news, etc.

It should be noted that any of the social networking servers 303, the live interaction servers 316, and the load balancing servers 313 is an example of the SNS 103 (FIG. 1) and any of the gaming servers 311 is an example of the game server 105 (FIG. 1). In other embodiments in which the game server 105 is used without using the SNS 103, any of the social networking servers 303, the live interaction servers 316, the load balancing servers 313, and the gaming servers 311 is an example of the game server 105.

It is noted that the embodiments illustrated in FIG. 8 are exemplary. Other embodiments may utilize different server configurations, divide the tasks differently among the servers, or exchange information between servers in different forms. The embodiments illustrated in FIG. 8 should therefore not be interpreted to be exclusive or limiting, but rather exemplary or illustrative.

Figure 9:
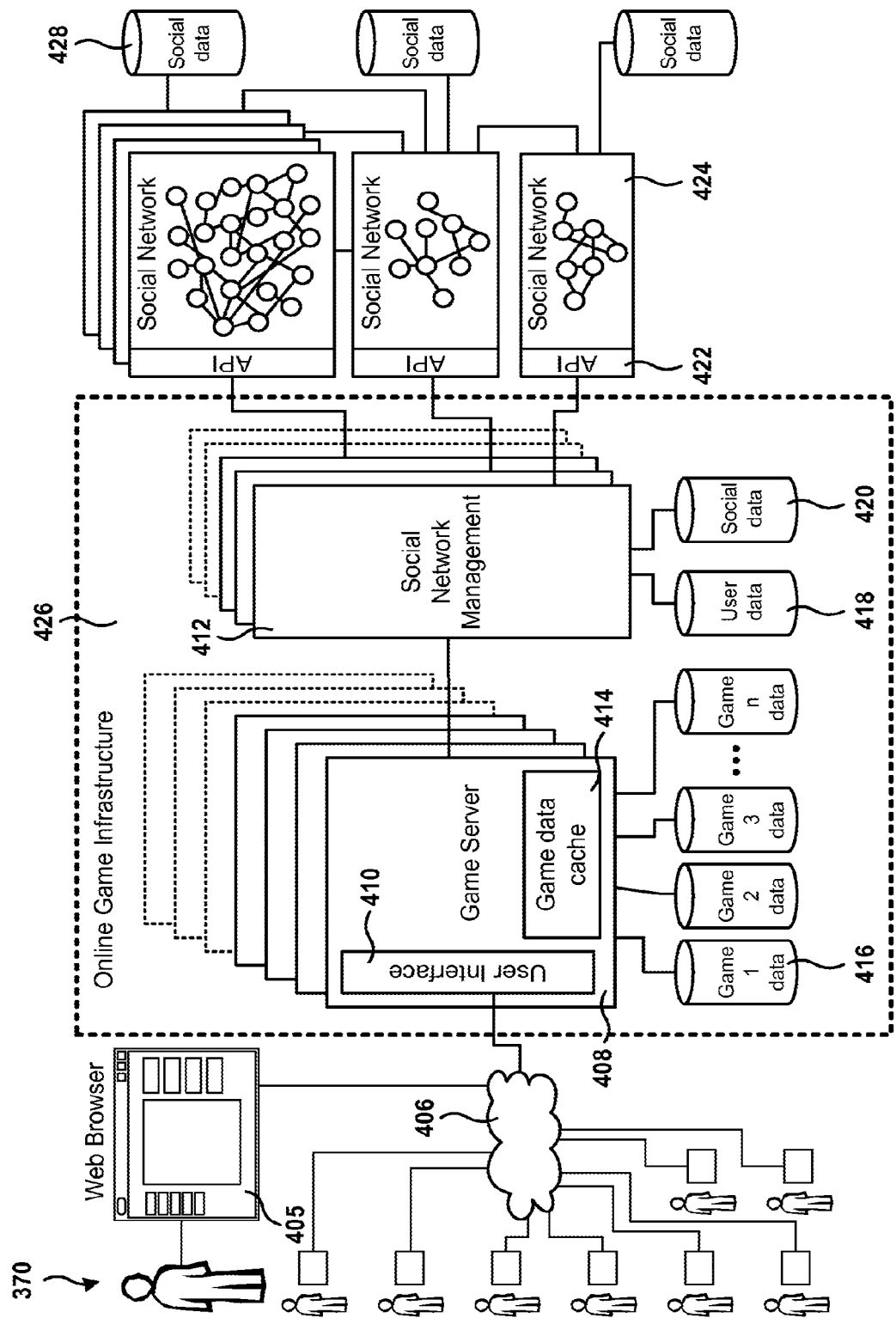
FIG. 9 illustrates an implementation of an online game infrastructure, according to one embodiment of the present invention.

FIG. 9 illustrates an implementation of an online game infrastructure 426, according to one embodiment. The online game infrastructure 426 includes one or more game servers 408, web servers (not shown), one or more social network management servers 412, and databases to store game related information. It should be noted that any of the game servers 408 is an example of the game server 105, and any of the social network management servers 412 is an example of the SNS 103 (FIG. 1). In other embodiments in which the game server 105 is used without using the SNS 103, any of the game servers 408 and the social network management servers 412 is an example of the game server 105.

In one embodiment, game server 408 provides a user interface 410 for players 370 to play the online game. In one embodiment, game server 408 includes a Web server for players 302 to access the game via a web browser 405, but the Web server may also be hosted in a server different from game server 408. Network 406, which is an example of the network 190 (FIG. 1), interconnects players 370 with the one or more game servers 408.

Each game server 408 has access to one or more game databases 416 for storing game data. In addition, a single database can store game data for one or more online games. Each game server 408 may also include one or more levels of caching. Game data cache 414 is a game data cache for the game data stored in game databases 416. For increased performance, caching may be performed in several levels of caching. For instance, data more frequently used is stored in a high priority cache, while data requiring less access during a session will be cached and updated less frequently.

The number of game servers 408 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 412 provide support for the social features incorporated into the online games. The social network management servers 412 access social data 428 from one or more social networks 424 via Application Programming Interfaces (API) 422 made available by the social network providers. Each social network 424 includes social data 428, and this social data 428, or a fraction of the social data, is made available via API 422. As in the case of the game servers, the number of social network management servers 412 that are active at a point in time changes according to the load on the infrastructure. As the demand for social data increases, the number of social network management servers 412 increases. Social network management servers 412 cache user data in database 418, and social data in database 420. The social data might include the social networks where a player is present, the social relationships for the player, the frequency of interaction of the player with the social network and with other players, etc. Additionally, the user data kept in database 418 may include the player's name, demographics, e-mail, games played, frequency of access to the game infrastructure, etc.

It is noted that the embodiment illustrated in FIG. 9 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 9 should therefore not be interpreted to be exclusive or limiting, but rather exemplary or illustrative.

Figure 10:
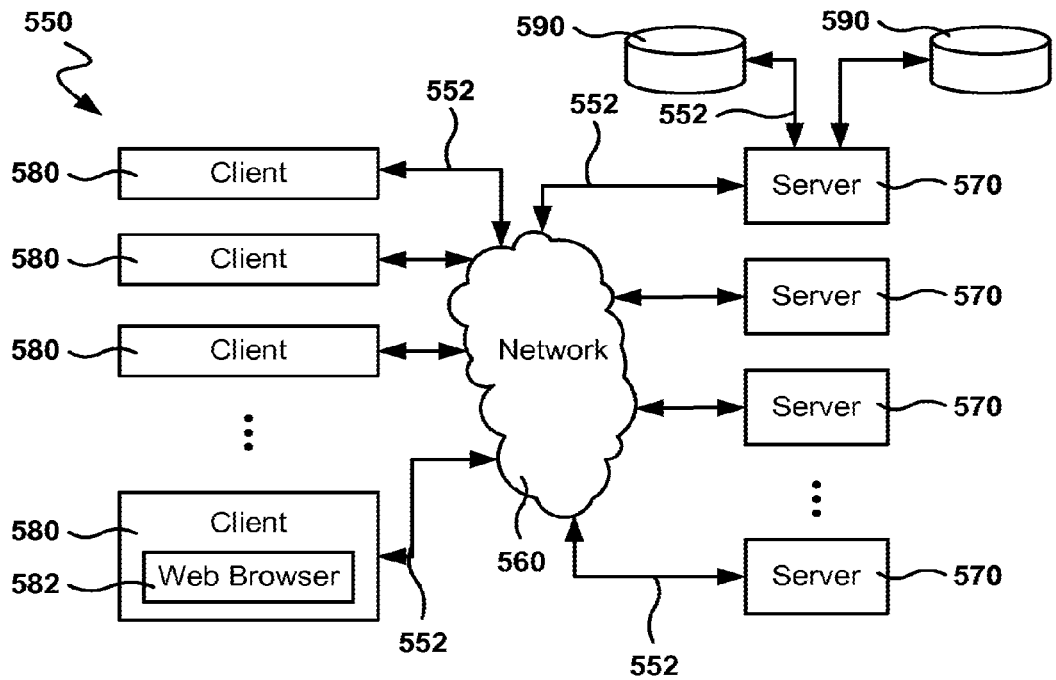
FIG. 10 illustrates an example network environment suitable for implementing embodiments of the present invention, according to one embodiment of the present invention.

FIG. 10 illustrates an example network environment 550 suitable for implementing embodiments of the invention. Network environment 550 includes a network 560 coupling one or more servers 570 and one or more clients 580 to each other. The network 560 is an example of the network 190 (FIG. 1) and the server 570 is an example of the game server 105 or the SNS 103 (FIG. 1). In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks.

One or more links 552 couple a server 570 or a client 580 to network 560. In particular embodiments, one or more links 552 each includes one or more wireline, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host hypertext markup language (HTML) files or other file types, or may dynamically create or constitute files upon a request, and communicate them to clients 580 in response to HTTP or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a netbook computer system, a handheld electronic device, or a mobile telephone. A client 580 may enable a network player at client 580 to access network 560. A client 580 may enable a player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582 and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JavaScript, Java, Microsoft Silverlight™, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 11:
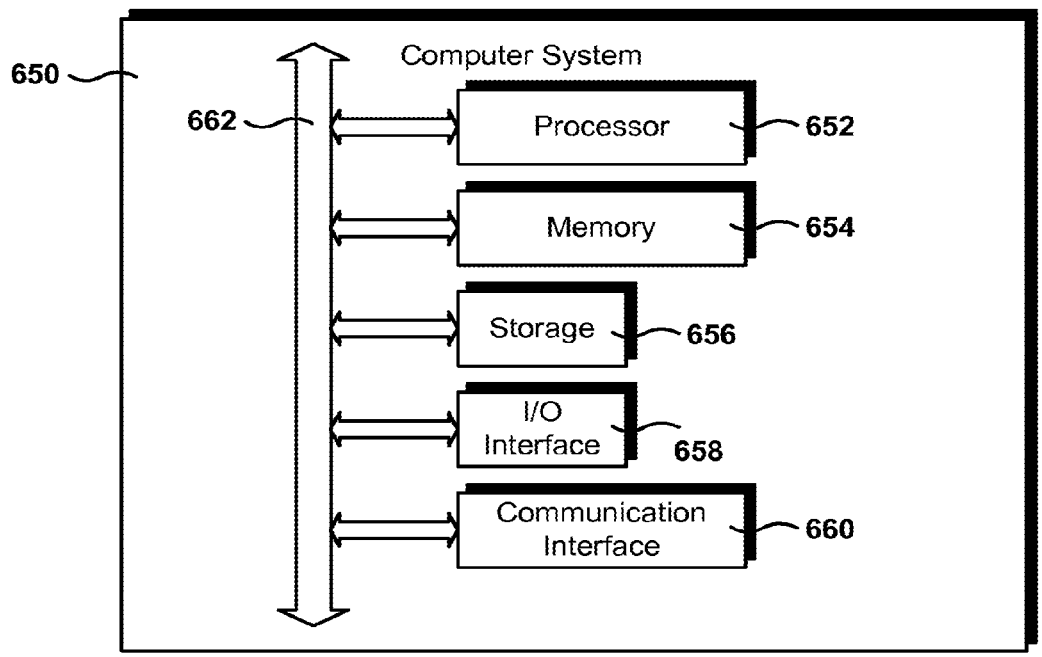
FIG. 11 illustrates an example a client device, according to one embodiment of the present invention.

FIG. 11 illustrates an example computer system 650 for implementing embodiments of the invention. In one embodiment, the computer system 650 is an example of a client device, such as the client device $192_a$ and $192_b$ (FIG. 1). In other embodiments, the computer system 650 is an example of the game server 105 or the SNS 103 (FIG. 1).

In some embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a client device, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems; be stand-alone or distributed; span multiple locations; span multiple machines; or reside in a cloud, which may include one or more cloud components in one or more networks. The one or more computer systems may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although the present disclosure describes and illustrates a particular computer system having a particular number of particular components in a particular arrangement, embodiments of the invention may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes a RAM, a ROM, or a combination thereof.

As an example and not by way of limitation, storage 656 may include a hard disk (HD), a floppy disk, a flash memory, an optical disc, a magneto-optical disc, a magnetic tape, or a combination of two or more of these. Storage 656 may include removable or non-removable (or fixed) media, where appropriate. In particular embodiments, storage 656 includes a ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices, such as a display device and an input device. A display device includes a display screen. Examples of a display device include an LCD device, an LED display device, a plasma display device, and a CRT display device. One or more of these I/O devices may enable communication between a user and computer system 650. As an example and not by way of limitation, an I/O device may include an input device, an output device, or a combination thereof. Examples of the I/O device include a keyboard, a keypad, a microphone, a monitor, a mouse, a printer, a scanner, a speaker, a still camera, a stylus, a touchscreen, a trackball, or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a Wi-Fi™ network. As an example, computer system 650 may communicate with a wireless personal area network (WPAN) (such as, for example, a Bluetooth WPAN), a Wi-Fi™ network, a worldwide interoperability for microwave access (WiMAX) network, a cellular telephone network (such as, for example, a Global System for Mobile Communications (GSM) network), or other suitable wireless network or a combination of two or more of these. As another example, the communication interface 660 includes a network interface card or a modem.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HyperTransport (HT) interconnect, an Industry Standard Architecture (ISA) bus, an Infiniband interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program, a module, information, bit stream, identifier, signature, context object, client state, or data. As an example and not by way of limitation, a computer-readable storage medium may include a semiconductor-based or other integrated circuit (IC) (such, as for example, an FPGA or an ASIC), a hard disk, an optical disc, a magneto-optical disc, a floppy disk, a magnetic tape, a holographic storage medium, a solid-state disk (SSD), a RAM, a Secure Digital card, or another suitable computer-readable storage medium or a combination of two or more of these, where appropriate. In some embodiments, any of the functions described herein are stored on one or more computer-readable storage media that is accessed by one or more processors to perform the functions.

The computer-readable storage medium is any data storage device or a memory device that can store data, which can be thereafter be read by a computer. Examples of the computer-readable storage medium include hard drives, network attached storage (NAS), ROM, random-access memory, compact disc-ROMs (CD-ROMs), CD-recordables (CD-Rs), CD-rewritables (RWs), magnetic tapes and other optical and non-optical data storage devices. In some embodiments, the computer-readable storage medium can be distributed over a network-coupled computer system so that the computer readable code is stored and executed in a distributed fashion.

Embodiments of the present invention may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

With the above embodiments in mind, it should be understood that the embodiments can employ various computer-implemented operations involving data stored in computer systems. These operations are those requiring physical manipulation of physical quantities. Any of the operations described herein that form part of the embodiments of the present invention are useful machine operations. The embodiments of the present invention also relate to a device or an apparatus for performing these operations. The apparatus can be specially constructed for a specific purpose. The apparatus is selectively activated or configured by a computer program stored in the computer.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:
    initiating a gaming session of a game upon receiving a request from a web account of a real user via a computer network;
    during the gaming session, generating a game environment including a view item;
    receiving via the computer network a message associated with the view item, the message indicating that a virtual user associated with the real user lacks a virtual item;
    initiating an additional gaming session of the game upon receiving an additional request via an additional web account of an additional real user;
    during the additional gaming session, generating an additional game environment, the additional game environment including an additional virtual user;
    receiving via the computer network an indication of an interaction with the view item by the additional virtual user;
    allowing the additional virtual user to asynchronously view the message in the view item in response to receiving the interaction with the view item, wherein said allowing the additional virtual user to asynchronously view the message in the view item is performed after an end of the gaming session associated with the web account of the real user;
    analyzing the view item for the additional web account to determine whether the additional web account has the virtual item for providing to the virtual user upon allowing the additional virtual user to asynchronously view the message in the view item; and
    sending via the computer network a query requesting the virtual item from one or more social network friends of the additional real user after determining that the additional web account of the additional real user lacks the virtual item.

2. The method of claim 1, further comprising:
    generating a list of the one or more social network friends associated with the additional web account and an option to send the query to the social network friends for providing via the computer network to a client device upon determining that the additional web account does not have the virtual item, the client device for accessing the additional web account, the query being whether the one or more social network friends have the virtual item;
    receiving via the computer network and the additional web account an indication of a selection indicating that the query is to be sent to the one or more social network friends,
    wherein sending the query is performed upon receiving the indication of the selection that the query is to be sent to the one or more social network friends.

3. The method of claim 1, wherein the game environment includes a count of the virtual item, and the count is different from an additional count of the virtual item within the additional game environment, wherein the count is an amount of the virtual item that is stored within the web account, wherein the additional count is another amount of the virtual item that is stored within the additional web account, wherein the virtual item is a virtual object.

4. The method of claim 1, wherein the view item is a virtual newsstand, wherein the virtual newsstand is used to publish messages to be displayed to virtual users that visit the game environment.

5. The method of claim 1, further comprising receiving during the gaming session via the computer network an indication of an interaction with the view item, wherein the message is received after the interaction with the view item during the gaming session, wherein the interaction with the view item received during the gaming session is a selection of the view item via an input device.

6. The method of claim 1, further comprising:
    receiving a request from the additional virtual user to visit the game environment, wherein the request from the additional virtual user to visit the game environment is generated when a selection of an identification of the web account is received via the computer network, wherein the identification of the web account is displayed within the additional game environment; and
    granting the request to visit the game environment, wherein the indication of the interaction with the view item by the additional virtual user is received after granting the request.

7. The method of claim 1, wherein the interaction with the view item by the additional virtual user is a view of the view item by the additional virtual user when the additional virtual user approaches the view item.

8. The method of claim 1, wherein the one or more social network friends are assigned one or more web accounts, wherein the one or more web accounts of the one or more social network friends and the additional web account of the additional real user are linked within a social network of the computer network.

9. A server comprising:
    a processor configured to:
        initiate a gaming session of a game upon receiving a request from a web account of a real user via a computer network;
        during the gaming session, generate a game environment including a view item;
        receive via the computer network a message associated with the view item, the message indicating that a virtual user associated with the real user lacks a virtual item;
        initiate an additional gaming session of the game upon receiving an additional request via an additional web account of an additional real user;
        during the additional gaming session, generate an additional game environment, the additional game environment including an additional virtual user;
        receive via the computer network an indication of an interaction with the view item by the additional virtual user;
        allow the additional virtual user to asynchronously view the message in the view item in response to receiving the interaction with the view item, wherein the additional virtual user is allowed to asynchronously view the message in the view item after an end of the gaming session associated with the web account of the real user;
        analyze the view item for the additional web account to determine whether the additional web account has the virtual item for providing to the virtual user upon allowing the additional virtual user to asynchronously view the message in the view item; and
        send via the computer network a query requesting the virtual item from one or more social network friends of the additional real user after determining that the additional web account of the additional real user lacks the virtual item; and a memory device coupled to the processor, the memory device configured to store the web account of the real user and the additional web account of the additional real user.

10. The server of claim 9, wherein the processor is configured to:
generate a list of the one or more social network friends associated with the additional web account and an option to send the query to the social network friends for providing via the computer network to a client device upon determining that the additional web account does not have the virtual item, the client device for accessing the additional web account, the query being whether the one or more social network friends have the virtual item;
receive via the computer network and the additional web account an indication of a selection indicating that the query is to be sent to the one or more social network friends,
wherein the processor is configured to send the query upon receiving the indication of the selection that the query is to be sent to the one or more social network friends.

11. The server of claim 9, wherein the game environment includes a count of the virtual item, and the count is different from an additional count of the virtual item within the additional game environment, wherein the count is an amount of the virtual item that is stored within the web account, wherein the additional count is another amount of the virtual item that is stored within the additional web account, wherein the virtual item is a virtual object.

12. The server of claim 9, wherein the view item is a virtual newsstand, wherein the virtual newsstand is used to publish messages to be displayed to virtual users that visit the game environment.

13. The server of claim 9, wherein the processor is configured to receive during the gaming session via the computer network an indication of an interaction with the view item, wherein the message is received after the interaction with the view item during the gaming session, wherein the interaction with the view item received during the gaming session is a selection of the view item via an input device.

14. The server of claim 9, wherein the processor is further configured to:
receive a request from the additional virtual user to visit the game environment, wherein the request from the additional virtual user to visit the game environment is generated when a selection of an identification of the web account is received via the computer network, wherein the identification of the web account is displayed within the additional game environment; and
grant the request to visit the game environment, wherein the indication of the interaction with the view item by the additional virtual user is received after granting the request.

15. The server of claim 9, wherein the interaction with the view item by the additional virtual user is a view of the view item by the additional virtual user when the additional virtual user approaches the view item.

16. The server of claim 9, wherein the one or more social network friends are assigned one or more web accounts, wherein the one or more web accounts of the one or more social network friends and the additional web account of the additional real user are linked within a social network of the computer network.

17. A non-transitory computer readable medium containing program instructions, wherein execution of the program instructions by one or more processors of a computer system causes the one or more processors to carry out a plurality of operations comprising:
initiating a gaming session of a game upon receiving a request from a web account of a real user via a computer network;
during the gaming session, generating a game environment including a view item;
receiving via the computer network a message associated with the view item, the message indicating that a virtual user associated with the real user lacks a virtual item;
initiating an additional gaming session of the game upon receiving an additional request via an additional web account of an additional real user;
during the additional gaming session, generating an additional game environment, the additional game environment including an additional virtual user;
receiving via the computer network an indication of an interaction with the view item by the additional virtual user;
allowing the additional virtual user to asynchronously view the message in the view item in response to receiving the interaction with the view item, wherein said allowing the additional virtual user to asynchronously view the message in the view item is performed after an end of the gaming session associated with the web account of the real user;
analyzing the view item for the additional web account to determine whether the additional web account has the virtual item for providing to the virtual user upon allowing the additional virtual user to asynchronously view the message in the view item; and
sending via the computer network a query requesting the virtual item from one or more social network friends of the additional real user after determining that the additional web account of the additional real user lacks the virtual item.

18. The non-transitory computer readable medium of claim 17, wherein the plurality of operations further comprise:
generating a list of the one or more social network friends associated with the additional web account and an option to send the query to the social network friends for providing via the computer network to a client device upon determining that the additional web account does not have the virtual item, the client device for accessing the additional web account, the query being whether the one or more social network friends have the virtual item;
receiving via the computer network and the additional web account an indication of a selection indicating that the query is to be sent to the one or more social network friends,
wherein sending the query is performed upon receiving the indication of the selection that the query is to be sent to the one or more social network friends.

19. The non-transitory computer readable medium of claim 17, wherein the game environment includes a count of the virtual item, and the count is different from an additional count of the virtual item within the additional game environment, wherein the count is an amount of the virtual item that is stored within the web account, wherein the additional count is another amount of the virtual item that is stored within the additional web account, wherein the virtual item is a virtual object.

20. The non-transitory computer readable medium of claim 17, wherein the view item is a virtual newsstand, wherein the virtual newsstand is used to publish messages to be displayed to virtual users that visit the game environment.

\* \* \* \* \*